United States Patent
Watariuchi

(10) Patent No.: US 8,363,242 B2
(45) Date of Patent: Jan. 29, 2013

(54) IMAGE PROCESSING APPARATUS AND IMAGE PROCESSING APPARATUS CONTROL METHOD FOR REQUESTING AN EXTERNAL APPARATUS TO TRANSMIT IMAGE DATA

(75) Inventor: Satoki Watariuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 12/604,732

(22) Filed: Oct. 23, 2009

(65) Prior Publication Data

US 2010/0110485 A1  May 6, 2010

(30) Foreign Application Priority Data

Oct. 31, 2008  (JP) ................................. 2008-281857

(51) Int. Cl.
*G06K 15/00* (2006.01)
*G06F 3/12* (2006.01)
(52) U.S. Cl. ...................... 358/1.14; 358/1.13; 358/1.15; 358/1.18; 715/234; 715/239; 715/255; 709/223
(58) Field of Classification Search ........ 358/1.13–1.15, 358/1.16–1.18; 715/255, 239
See application file for complete search history.

(56) References Cited

U.S. PATENT DOCUMENTS

| | | | |
|---|---|---|---|
| 6,552,813 B2 * | 4/2003 | Yacoub ........................... | 358/1.1 |
| 6,598,087 B1 * | 7/2003 | Dixon et al. .................. | 709/236 |
| 7,516,198 B1 * | 4/2009 | Appala et al. ................. | 709/219 |
| 7,730,490 B2 * | 6/2010 | Ito ................................ | 718/106 |
| 2002/0089692 A1 * | 7/2002 | Ferlitsch ...................... | 358/1.15 |
| 2004/0239981 A1 * | 12/2004 | Ducato et al. ................ | 358/1.15 |
| 2005/0055475 A1 | 3/2005 | Mackay | |
| 2008/0068640 A1 | 3/2008 | Todaka | |
| 2008/0247004 A1 | 10/2008 | Yeung | |
| 2008/0259384 A1 | 10/2008 | Ito | |

FOREIGN PATENT DOCUMENTS

| | | |
|---|---|---|
| JP | 2004-287860 A | 10/2004 |
| WO | 2007/043420 A1 | 4/2007 |

\* cited by examiner

*Primary Examiner* — Twyler Haskins
*Assistant Examiner* — Dennis Dicker
(74) *Attorney, Agent, or Firm* — Canon USA, Inc., IP Division

(57) ABSTRACT

An image processing apparatus which has a reading unit configured to read an image of a document and generate image data acquires a process definition file which defines a content of reading processing to be executed and a content of transmission processing for transmitting the generated image data, causes the reading unit to execute the reading processing to generate image data according to a definition described in the acquired process definition file, requests an external apparatus to transmit the generated image data according to the definition described in the acquired process definition file, adds, to the acquired process definition file, a description for causing the external apparatus to execute processing for notifying a result of the transmission by the external apparatus, and makes the request by transmitting, to the external apparatus, the generated image data and the process definition file to which the description is added.

17 Claims, 26 Drawing Sheets

FIG.6

510 PROCESS DEFINITION FILE

```xml
<?xml version="1.0"encoding="UTF-8"?>
```
601 — `<Process id="0001"caption="SCAN AND SEND TO DIVISION MANAGER VIA E-MAIL">`
602 — `<Scan>`
603 — `<Setting type="color">`
  `GRAY_SCALE`
  `</Settinng>`
  `<Setting>...</Setting>`
  `</Scan>`
604 — `<Send type="email">`
605 — `<Setting type="address">`
  `manager@xxxx.xxxx`
  `</Setting>`
  `<Setting>...</Setting>`
  `</Send>`
`</Process>`

FIG.8

800 PROCESS DEFINITION FILE

```xml
<?xml version="1.0"encoding="UTF-8"?>
<Process id="0001"caption="SCAN AND SEND TO DIVISION MANAGER VIA E-MAIL">
    <Scan>
       <Setting type="color">
          GRAY_SCALE
       </Settinng>
       <Setting>…</Setting>
    </Scan>
    <Send type="email">
       <Setting type="address">
          manager@xxxx.xxxx
       </Setting>
       </Setting>…</Setting>
    </Send>
    </Report type="display">     801
       <Setting type="destination">   802
          SELF
       </Setting>
       <Setting type="address">   803
          192.168.0.103
       </Setting>
    </Report>
</Process>
```

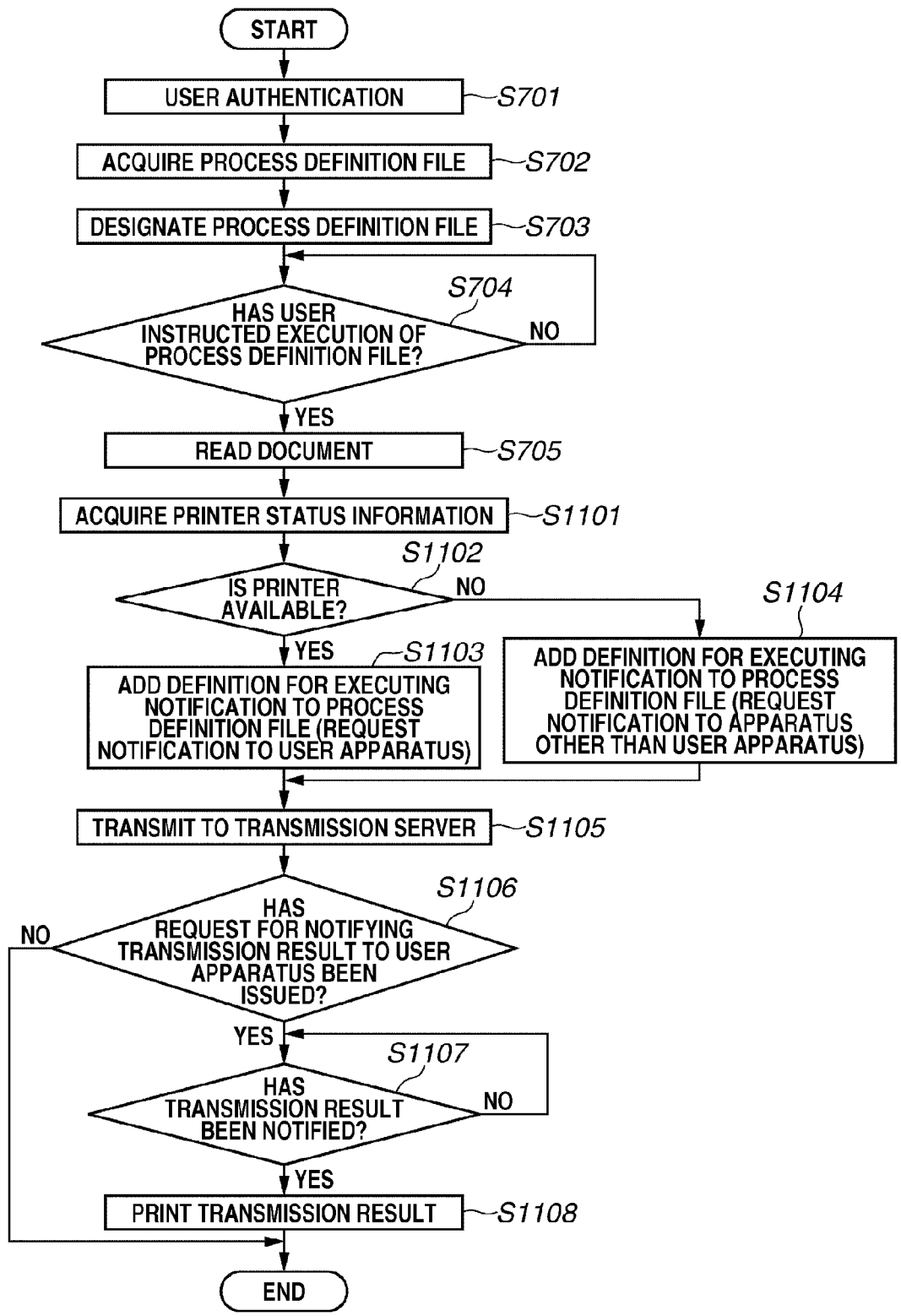

FIG.12

1200 PROCESS DEFINITION FILE

```
<?xml version="1.0"encoding="UTF-8"?>
<Process id="0001"caption="SCAN AND SEND TO DIVISION MANAGER VIA E-MAIL">
    <Scan>
        <Setting type="color">
            GRAY_SCALE
        </Settinng>
        <Setting>...</Setting>
    </Scan>
    <Send type="email">
        <Setting type="address">
            manager@xxxx.xxxx
        </Setting>
        <Setting>...</Setting>
    </Send>
    </Report type="print">
        <Setting type="destination">
            SELF
        </Setting>
        <Setting type="address">
            192.168.0.103
        </Setting>
    </Report>
</Process>
```

1201 — </Report type="print">
1202 — <Setting type="destination">
1203 — <Setting type="address">

FIG.13

1300 PROCESS DEFINITION FILE

```xml
<?xml version="1.0"encoding="UTF-8"?>
<Process id="0001"caption="SCAN AND SEND TO DIVISION MANAGER VIA E-MAIL">
    <Scan>
        <Setting type="color">
            GRAY_SCALE
        </Settinng>
        <Setting>···</Setting>
    </Scan>
    <Send type="email">
        <Setting type="address">
            manager@xxxx.xxxx
        </Setting>
        <Setting>···</Setting>
    </Send>
    </Report type="print">              1301
        <Setting type="destination">    1302
            ANOTHR
        </Setting>
        <Setting type="address">        1303
            192.168.0.106
        </Setting>
    </Report>
</Process>
```

FIG.14

1400 TRANSMISSION RESULT REPORT

--TRANSMISSION RESULT REPORT--
TRANSMISSION RESULT: OK

- PROCESS NAME → SCAN AND SEND TO DIVISION MANAGER VIA E-MAIL
- TRANSMISSION METHOD TYPE → E-MAIL
- TRANSMISSION START DATE AND TIME → 2008/10/06 10:23
- TRANSMISSION END DATE AND TIME → 200810/06 10:24
- TRANSMISSION DESTINATION → manager@xxxx.xxxx
  .
  .
  .

- 1 -

USER AUTHORITY
1600   INFORMATION
MANAGEMENT TABLE

FIG.18

|  | E-MAIL ADDRESS |
|---|---|
| USER A | user_a@xxxx.xxxx |
| USER B | user_b@xxxx.xxxx |
| USER C | — |

1801

1800 USER ATTRIBUTE INFORMATION MANAGEMENT TABLE

FIG.19

1900 PROCESS DEFINITION FILE

```
<?xml version="1.0"encoding="UTF-8"?>
<Process id="0001"caption="SCAN AND SEND TO DIVISION MANAGER VIA E-MAIL">
    <Scan>
        <Setting type="color">
            GRAY_SCALE
        </Settinng>
        <Setting>...</Setting>
    </Scan>
    <Send type="email">
        <Setting type="address">
            manager@xxxx.xxxx
        </Setting>
        </Setting>...</Setting>
    </Send>
    </Report type="email">
        <Setting type="address">
            aaaa@xxxx.xxxx
        </Setting>
    </Report>
</Process>
```

1901 — </Report type="email">
1902 — <Setting type="address">

FIG.20

2000 TRANSMISSION RESULT NOTIFICATION E-MAIL

Date: Mon, 06 Oct 2008 10:25:47+0900
From: server@xxxx.xxxx
To: aaaa@xxxx.xxxx
Subject: TRANSMISSION RESULT

- TRANSMISSION RESULT: OK
- PROCESS NAME → SCAN AND SEND TO DIVISION MANAGER VIA E-MAIL
- TRANSMISSION METHOD TYPE → E-MAIL
- TRANSMISSION START DATE AND TIME → 2008/10/06 10:23
- TRANSMISSION END DATE AND TIME → 200810/06 10:24
- TRANSMISSION DESTINATION → manager@xxxx.xxxx
  ·
  ·
  ·

FIG.22

|  | USER NAME |
|---|---|
| LOGIN USER | USER A |

2201

2200 LOGIN STATUS INFORMATION MANAGEMENT TABLE

FIG.26

|  | PROCESS ID *2601* | NOTIFICATION METHOD *2602* |
|---|---|---|
| USER A | 0001 | PRINT |
| USER A | others | SEND VIA E-MAIL |
| USER B | all | DISPLAY |

*2600* NOTIFICATION METHOD SETTING INFORMATION MANAGEMENT TABLE

IMAGE PROCESSING APPARATUS AND IMAGE PROCESSING APPARATUS CONTROL METHOD FOR REQUESTING AN EXTERNAL APPARATUS TO TRANSMIT IMAGE DATA

BACKGROUND OF THE INVENTION

1. Field of the Invention

The present invention relates to an image processing apparatus and an image processing apparatus control method configured to read an image of a document, generate image data based on the read document image, and issue a request to transmit the generated image data to an external apparatus.

2. Description of the Related Art

In recent years, a conventional image processing apparatus which includes a reading function for reading an image of a document and generating image data of the read document image and a transmission function for transmitting the generated image data has been widely used. In utilizing an image processing apparatus like this, a user designates a reading parameter for reading an image of a document and also designates a transmission protocol and a transmission destination for transmitting the generated image data. The image processing apparatus reads an image of a document and transmits the generated image data according to the content of the designation by the user.

In executing a series of processing using a combination of a plurality of functions as described above, it is necessary for a user to designate a large number of parameters. Accordingly, it is necessary for the user to execute complicated operations.

In order to solve the above-described problem, Japanese Patent Application Laid-Open No. 2004-287860 discusses a method, when a plurality of services is performed in cooperation with one another, for processing a document according to a definition described in a previously generated instruction which defines a content of a plurality of processing to be executed.

According to the method discussed in Japanese Patent Application Laid-Open No. 2004-287860, it is necessary for the user only to issue an instruction for executing the previously generated instruction to serially execute the processing according to the content described in the instruction. Accordingly, it is not necessary for the user to perform complicated operations.

When a series of processing is executed utilizing a combination of a plurality of functions, the user can utilize not only functions of one apparatus but also a combination of functions of a plurality of apparatuses.

Japanese Patent Application Laid-Open No. 2004-287860 discusses a method for utilizing a plurality of apparatuses including an image processing apparatus, a document management server, and a document transmission server in cooperation with one another. In the method discussed in Japanese Patent Application Laid-Open No. 2004-287860, one instruction describes the content of processing to be executed by each apparatus. In this method, if the user selects an arbitrary instruction and issues an instruction for executing the instruction, each apparatus serially executes processing according to the definition described in the instruction.

However, when a series of processing is executed utilizing a plurality of apparatuses operating in cooperation with one another as described above, the user cannot easily verify a result of the processing executed on an apparatus other than the apparatus the user operates.

In the method discussed in Japanese Patent Application Laid-Open No. 2004-287860, a cooperative processing server configured to manage the cooperation among apparatuses centrally manages results of the processing executed on each apparatus.

However, in an environment which does not include a mechanism like the cooperative processing server discussed in Japanese Patent Application Laid-Open No. 2004-287860 for managing the cooperation among apparatuses, each apparatus merely executes the processing defined in the instruction. Therefore, the user cannot verify the results of the processing unless the definition includes an instruction for notifying the user of the processing results.

In addition, even if the mechanism for managing the cooperation among the apparatuses is provided, in the method discussed in Japanese Patent Application Laid-Open No. 2004-287860, the result of the processing executed on an apparatus other than the user apparatus is notified to the user by a predetermined fixed method. Accordingly, in the above-described conventional method, the processing results cannot be notified to the user by selecting a method appropriate for a situation of the operation.

SUMMARY OF THE INVENTION

The present invention is directed to a mechanism configured, in requesting transmission of image data according to a definition described in a process definition file, to add a description for instructing notification of a result of the transmission to the process definition file.

According to an aspect of the present invention, an image processing apparatus includes a reading unit configured to read an image of a document and generate image data based on the read image of the document, an acquisition unit configured to acquire a process definition file which defines a content of reading processing to be executed by the reading unit and a content of transmission processing for transmitting the image data generated by the reading unit, a reading control unit configured to cause the reading unit to execute the reading processing and to generate image data according to a definition described in the process definition file acquired by the acquisition unit, a requesting unit configured to request an external apparatus to transmit the image data generated by the reading unit according to the definition described in the process definition file acquired by the acquisition unit; and an adding unit configured to add, to the process definition file acquired by the acquisition unit, a description for instructing the external apparatus to execute notification processing for notifying a result of the transmission processing of the image data carried out by the external apparatus. In the image processing apparatus, the requesting unit is configured to issue the request by transmitting, to the external apparatus, the image data generated by the reading unit and the process definition file to which the description for instructing the external apparatus to execute the processing for notifying the result of the transmission processing is added by the adding unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 6 illustrates a specific example of a description included in a process definition file according to an exemplary embodiment of the present invention.

FIG. 8 illustrates a specific example of a description included in a process definition file according to an exemplary embodiment of the present invention.

FIG. 11 is a flow chart illustrating an exemplary operation of the MFP according to an exemplary embodiment of the present invention.

FIG. 12 illustrates a specific example of a description included in a process definition file according to an exemplary embodiment of the present invention.

FIG. 13 illustrates a specific example of a description included in a process definition file according to an exemplary embodiment of the present invention.

FIG. 14 illustrates an example of a transmission result report according to an exemplary embodiment of the present invention.

FIG. 18 illustrates an example of a user attribute information management table according to an exemplary embodiment of the present invention.

FIG. 19 illustrates a specific example of a description included in a process definition file according to an exemplary embodiment of the present invention.

FIG. 20 illustrates an example of a transmission result notification e-mail according to an exemplary embodiment of the present invention.

FIG. 22 illustrates an example of a login status information management table according to an exemplary embodiment of the present invention.

FIG. 26 illustrates an example of a notification method setting information management table according to an exemplary embodiment of the present invention.

DESCRIPTION OF THE EMBODIMENTS

Various exemplary embodiments, features, and aspects of the invention will be described in detail below with reference to the drawings.

A first exemplary embodiment of the present invention will be described in detail below.

In the present exemplary embodiment, a method configured, when a request to transmit image data is issued from an MFP 103 (FIG. 1) to a transmission server 104 (FIG. 1), to add a description for causing the transmission server 104 to notify a transmission result to a process definition file will be primarily described.

Figure 1:
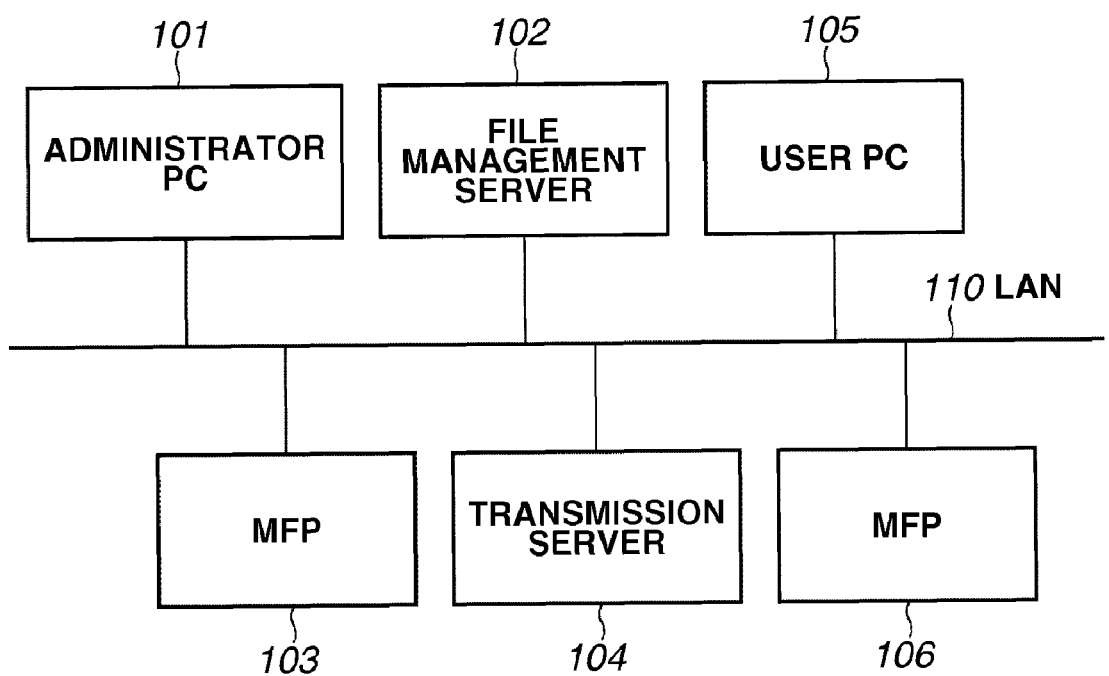
FIG. 1 illustrates an example of an entire configuration of an image processing system according to an exemplary embodiment of the present invention.

FIG. 1 illustrates an exemplary configuration of an entire image processing system according to the present exemplary embodiment.

Referring to FIG. 1, an administrator PC 101, a file management server 102, the MFP 103, the transmission server 104, a user PC 105, and an MFP 106 are in communication with one another via a local area network (LAN) 110.

Although not illustrated in FIG. 1, an e-mail server and a file transfer protocol (FTP) server are provided on the LAN 110. With this configuration, the transmission server 104 and the user PC 105 can transmit and receive an e-mail and also transmit and receive image data by using an FTP protocol via the LAN 110.

Figure 2:
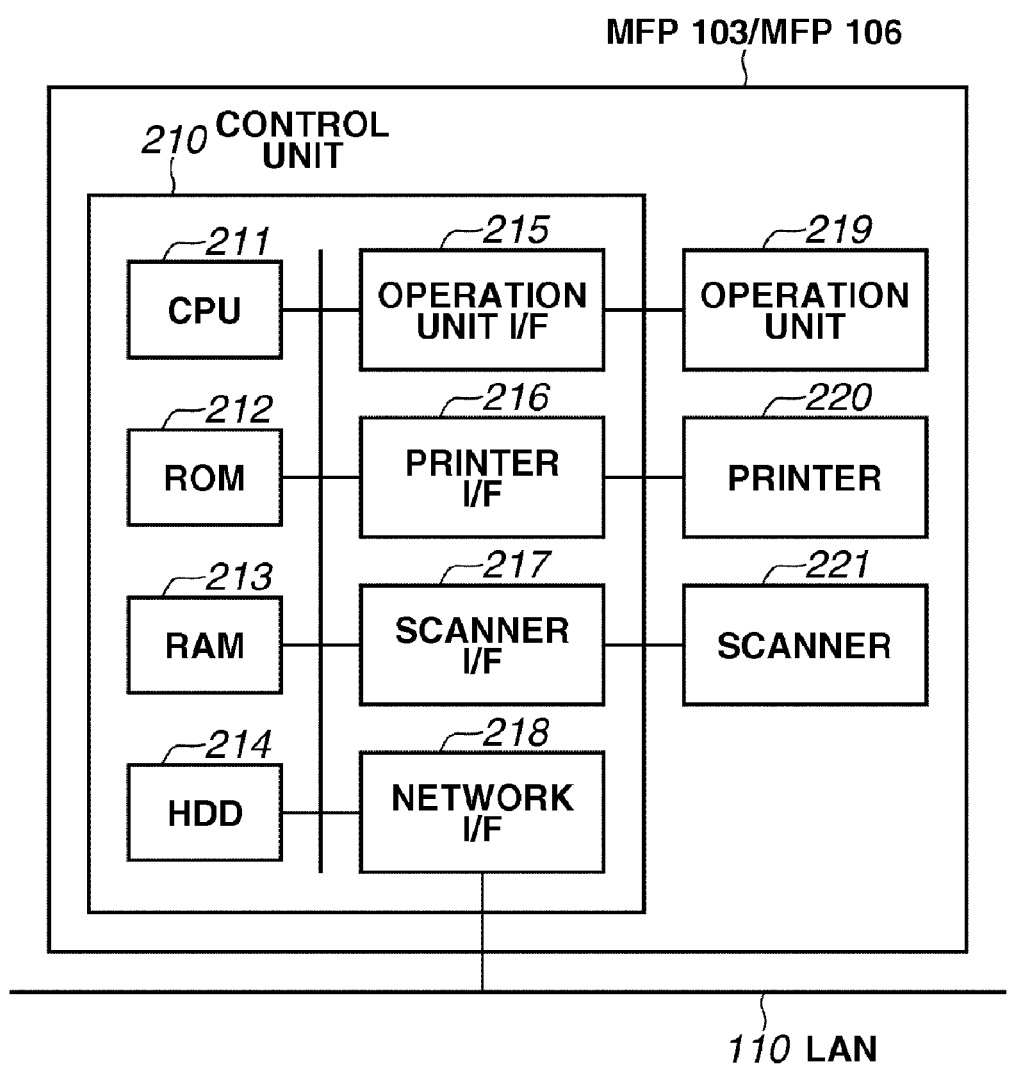
FIG. 2 illustrates an exemplary configuration of a multi-function peripheral (MFP) according to an exemplary embodiment of the present invention.

FIG. 2 is a block diagram illustrating an exemplary configuration of the MFP 103. Because the MFP 106 has the configuration similar to that of the MFP 103, the configuration of the MFP 103 will be described in detail below.

Referring to FIG. 2, a control unit 210 which includes a central processing unit (CPU) 211 controls operations of the entire MFP 103. The CPU 211 reads a control program stored on a read-only memory (ROM) 212 and executes various control processing, such as reading control and transmission control, based on the read control program.

A random access memory (RAM) 213 is used as a temporary storage area, such as a main memory or a work area of the CPU 211. A hard disk drive (HDD) 214 stores image data, various programs, and various information tables. The information tables will be described in detail below.

An operation unit interface (I/F) 215 is an interface between an operation unit 219 and the control unit 210. The operation unit 219 includes a liquid crystal display (LCD) unit having a touch panel function and a keyboard. A printer I/F 216 is an interface between a printer 220 and the control unit 210.

Image data to be printed on the printer 220 is transferred from the control unit 210 to the printer 220 via the printer I/F 216. The printer 220 prints the received image data on a recording medium.

A scanner I/F 217 is an interface between a scanner 221 and the control unit 210. The scanner 221 reads an image of a document and generates image data based on the read document image. In addition, the scanner 221 inputs the generated image data to the control unit 210 via the scanner I/F 217.

A network I/F 218 is an interface between the control unit 210 (the MFP 103) and the LAN 110. The network I/F 218 transmits image data to and receives various information from an external apparatus (e.g., the transmission server 104) on the LAN 110.

Figure 3:
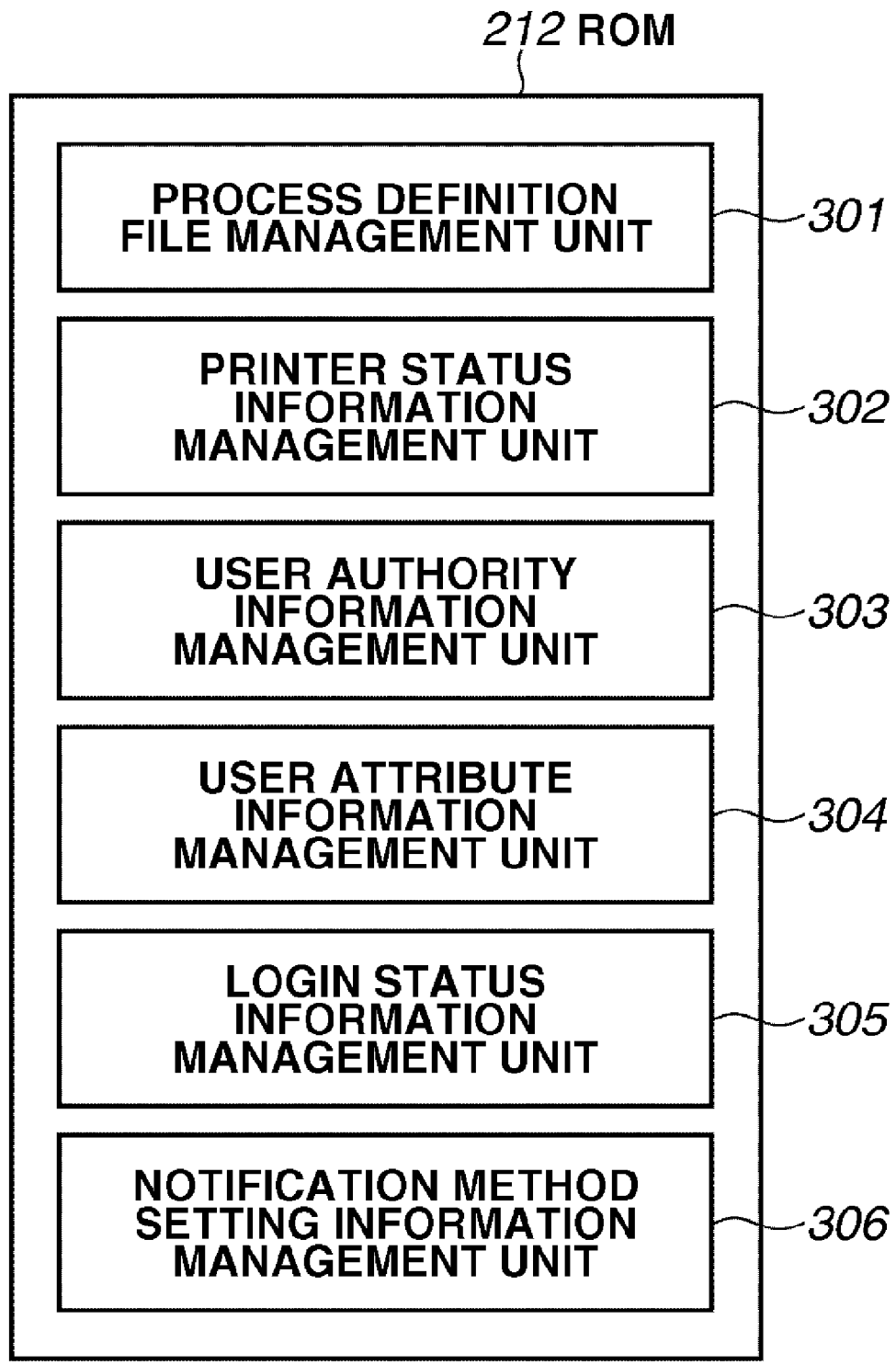
FIG. 3 illustrates an exemplary software configuration of the MFP according to an exemplary embodiment of the present invention.

FIG. 3 illustrates an exemplary configuration of software which is implemented by the CPU 211 by reading and executing various control programs stored on the ROM 212 of the MFP 103. A process definition file management unit 301 manages a process definition file that the MFP 103 acquires from the file management server 102. A printer status information management unit 302 manages printer status information which indicates whether the printer 220 is in an available state.

A user authority information management unit 303 manages user authority information which indicates an authority provided to each user who is authenticated by a user authentication function of the MFP 103.

A user attribute information management unit 304 manages user attribute information which indicates an attribute of each user authenticated by the user authentication function of the MFP 103.

A login status information management unit 305 manages login status information which indicates whether a user authenticated by the user authentication function of the MFP 103 is currently logged into the apparatus or has already logged out from the apparatus.

A notification method setting information management unit 306 manages notification method setting information which indicates a notification method previously set by an administrator.

Figure 4:
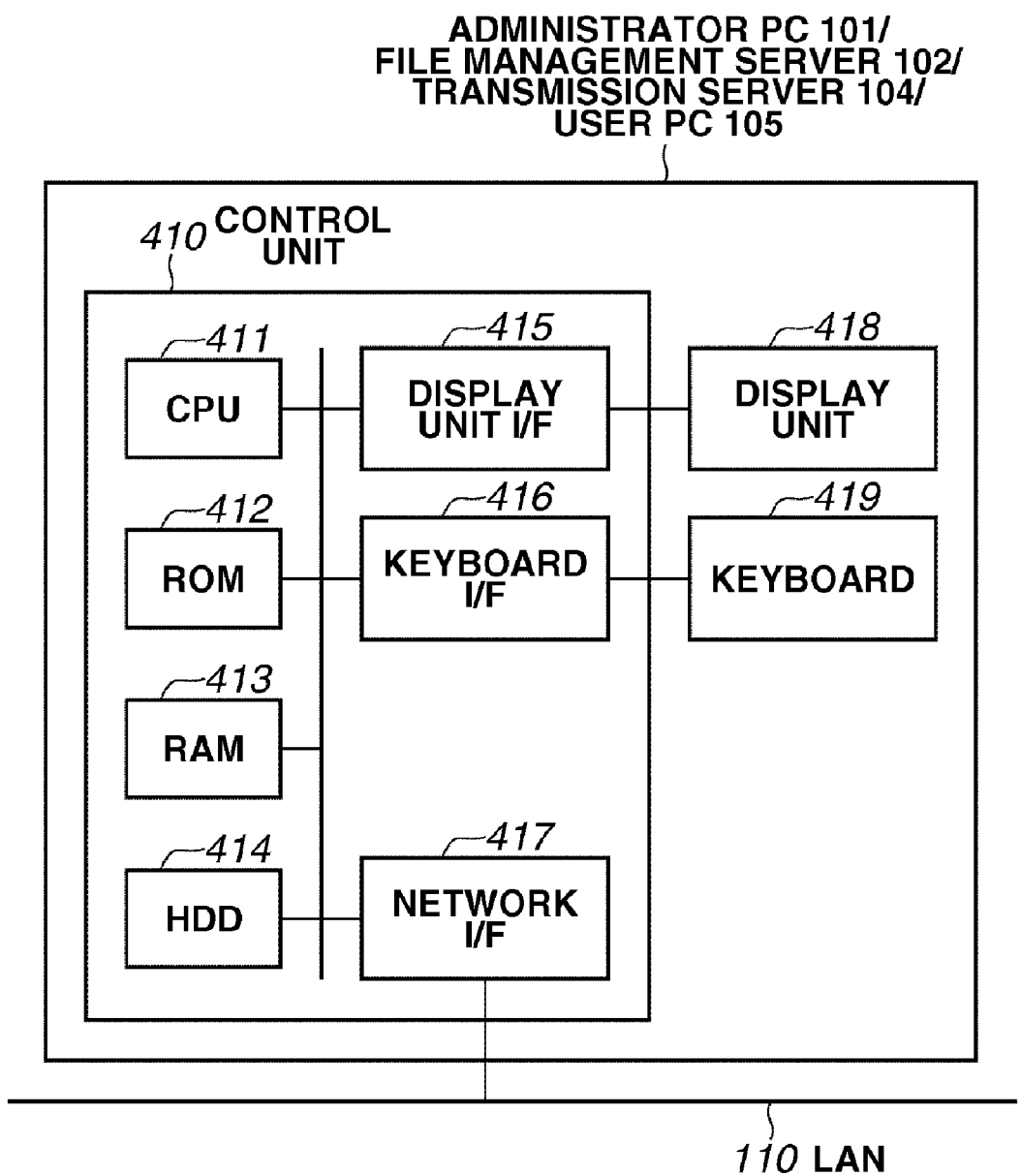
FIG. 4 illustrates an exemplary configuration of an administrator personal computer (PC) according to an exemplary embodiment of the present invention.

FIG. 4 illustrates an exemplary configuration of the administrator PC 101. The file management server 102, the transmission server 104, and the user PC 105 have the configuration similar to that of the administrator PC 101. Accordingly, the configuration of the administrator PC 101 will be described in detail below.

A control unit 410 which includes a CPU 411 controls operations of the entire administrator PC 101. The CPU 411 reads a control program stored on a ROM 412 and executes various control processing based on the read control program.

A RAM 413 is used as a temporary storage area, such as a main memory and a work area of the CPU 411. An HDD 414 stores image data, various programs, and various information tables. The information tables will be described in detail below.

A display unit I/F 415 is an interface between a display unit 418 and the control unit 410. A keyboard I/F 416 is an interface between a keyboard 419 and the control unit 410.

The CPU 411 receives a user instruction input via the keyboard 419 and change among screens to be displayed on the display unit 418 according to the received user instruction.

A network I/F 417 is an interface between the control unit 410 (the administrator PC 101) and the LAN 110. The network I/F 417 transmits and receives various information to and from other apparatuses on the LAN 110.

An operation of the entire image processing system will be described in detail below with reference to FIG. 5.

A user operates the administrator PC 101 to generate a process definition file 510. The process definition file 510 includes a definition for executing a series of processing by utilizing a plurality of functions of the MFP 103 and the transmission server 104.

In the present exemplary embodiment, it is supposed that the process definition file 510 includes a definition for executing a series of processing including causing the MFP 103 to read an image of a document and generate image data based on the read document image and causing the transmission server 104 to transmit the generated image data to a predetermined transmission destination.

Figure 5:
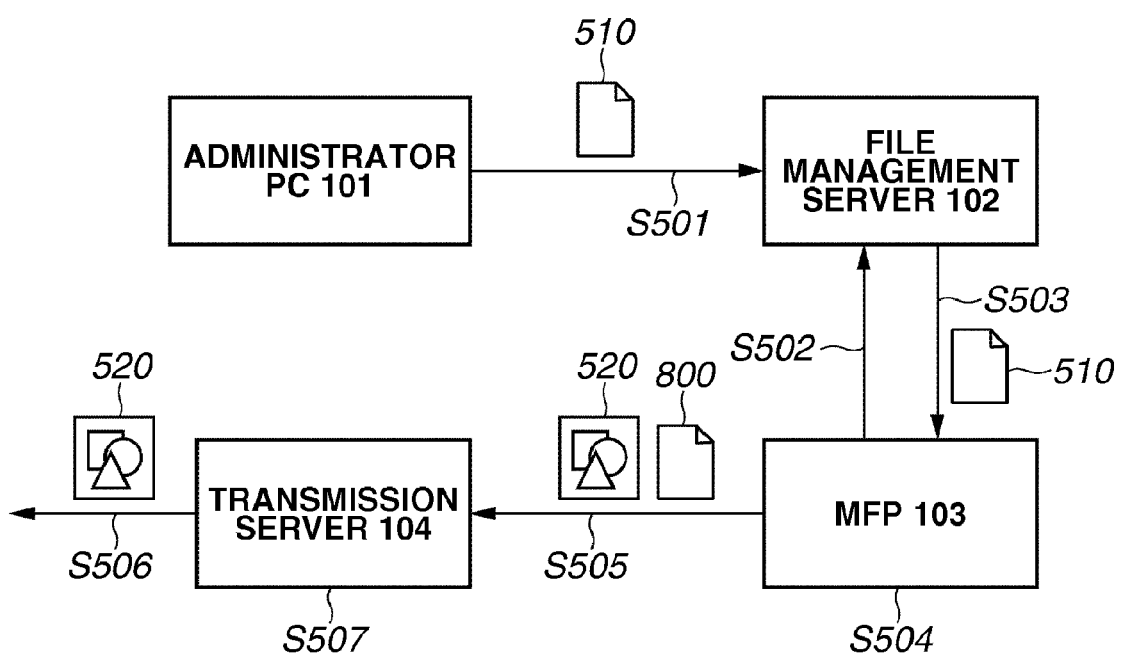
FIG. 5 schematically illustrates an exemplary operation of the entire image processing system according to an exemplary embodiment of the present invention.

When the user inputs various processing contents (e.g., a reading parameter and a transmission destination) via a process definition file generation screen displayed on the administrator PC 101, the flow of processing illustrated in FIG. 5 starts.

After generation of the process definition file is completed, in step S501, the administrator PC 101 transmits the generated process definition file 510 to the file management server 102 via the LAN 110. After receiving the process definition file 510 from the administrator PC 101, the file management server 102 registers and stores the received process definition file 510 in association with user identification (ID).

In step S502, if a user logs into the MFP 103 after that, then the MFP 103 transmits the user ID corresponding to the login user to the file management server 102. Further, the MFP 103 issues a request to transmit a process definition file corresponding to the login user.

In step S503, after receiving the request to transmit the process definition file from the MFP 103, the file management server 102 reads and transmits the process definition file 510 corresponding to the received user ID to the MFP 103 via the LAN 110.

In step S504, after receiving the process definition file 510 from the file management server 102, the MFP 103 indicate the acquired process definition file 510 to the user and receives a designation of the process definition file 510 from the user. In addition, the MFP 103 causes the scanner 221 to execute reading processing according to the definition included in the process definition file designated by the user.

Further, the MFP 103 generates image data according to the definition included in the designated process definition file. Moreover, in requesting transmission of the generated image data to the transmission server 104, the MFP 103 adds to the process definition file a description for causing the transmission server 104 to execute processing for notifying a result of image data transmission processing by the transmission server 104.

In step S505, the MFP 103 transmits generated image data 520 and a process definition file 800 to which the description for instructing the notification of the transmission result is added to the transmission server 104. In addition, the MFP 103 requests the transmission server 104 to transmit the image data.

In step S506, the transmission server 104 transmits the image data 520 by utilizing an e-mail or a FTP protocol according to the definition included in the received process definition file 800. In step S507, the transmission server 104 notifies the transmission result according to the definition included in the received process definition file 800.

According to the above-described configuration, the present exemplary embodiment can save a user from executing complicated operations for designating a reading parameter and a transmission destination every time the user reads a document on the MFP 103. In addition, the present exemplary embodiment can prevent a user of the MFP 103 from executing processing that the administrator of the system does not intend to allow the user to execute, by inhibiting modification by the MFP 103 of the content which is designated when the process definition file is generated on the administrator PC 101.

FIG. 6 illustrates a specific example of descriptions included in the process definition file 510 registered on the file management server 102. In the example illustrated in FIG. 6, the process definition file is described in the extended Markup Language (XML) format. However, the present exemplary embodiment is not limited to the XML format and the process definition file can be described in a different format. Each processing defined in the process definition file is described as an XML tag and the processing is executed in order of the descriptions included in the process definition file.

Referring to FIG. 6, a tag 601 indicates that the processing is one integrated process including a combination of a plurality of processing. The tag 601 includes a process ID that uniquely identifies the process definition file ("0001" in the example illustrated in FIG. 6), and a name of the process ("scan and send to the division manager by e-mail" in the example illustrated in FIG. 6).

A tag 602 defines processing for reading an image of a document by the scanner and generating image data based on the read document image. A tag 603 defines an instruction for generating gray scale image data when the scanner read the image of the document.

A tag 604 defines an instruction for transmitting the image data by e-mail. A tag 605 describes the e-mail address of a transmission destination of the image data (manager@xxxx.xxxx in the example illustrated in FIG. 6).

Figure 7:
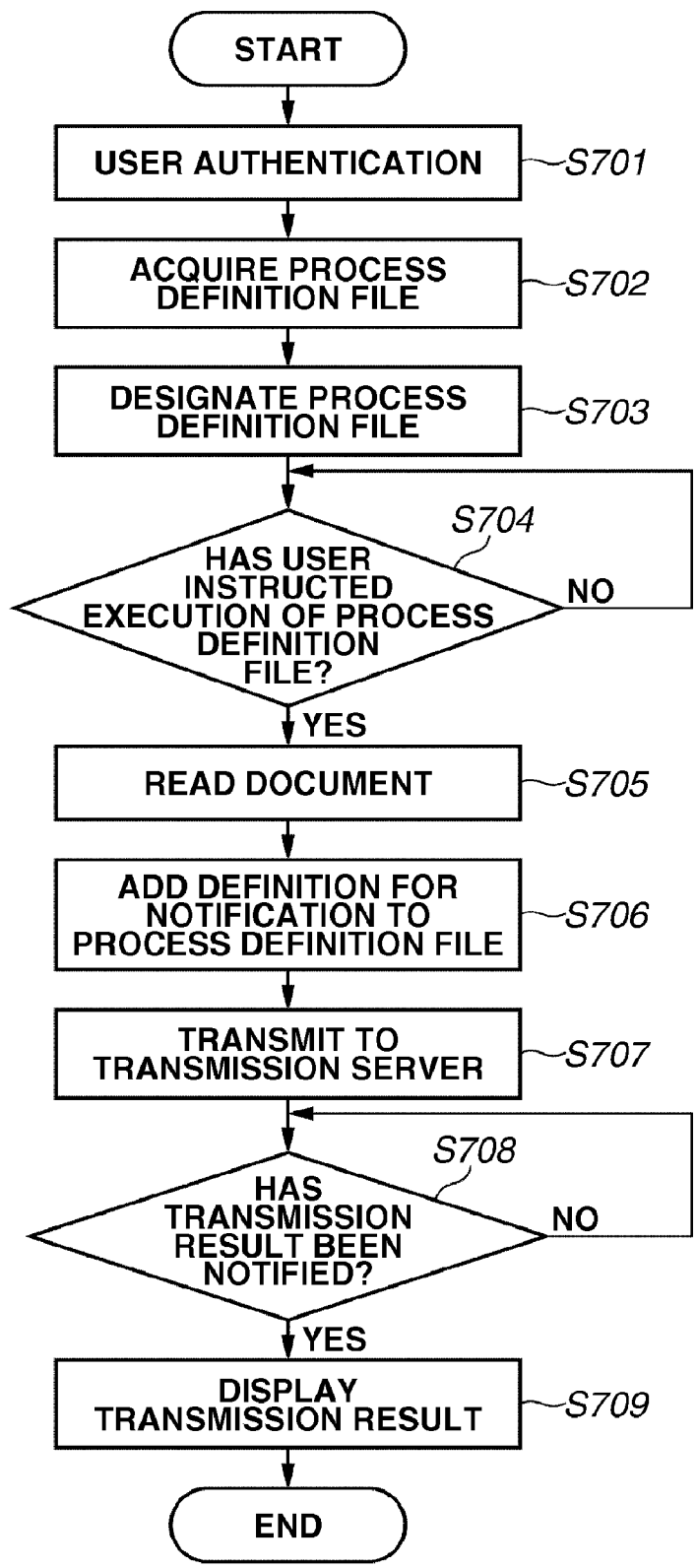
FIG. 7 is a flow chart illustrating an exemplary operation of the MFP according to an exemplary embodiment of the present invention.

FIG. 7 is a flow chart illustrating an example of a series of processing executed by the MFP 103 for generating image data according to the designated process definition file, adding a description for causing the transmission server 104 to notify a transmission result, and requesting the transmission server 104 to transmit the image data. Each processing illustrated in the flow chart of FIG. 7 is implemented by the CPU 211 of the MFP 103 by executing the control program.

In step S701, the CPU 211 authenticates the user of the MFP 103. More specifically, the CPU 211 displays an authentication information input screen for inputting authentication information on the operation unit 219. Further, the CPU 211 checks the authentication information input via the authentication information input screen with previously stored authentication information to authenticate the user.

For authenticating a user, any publicly known method such as a method for inputting authentication information by reading an ID card or a method for authenticating the user by using biometric information can be used.

If the user has been normally authenticated in step S701, then the processing advances to step S702. In step S702, the CPU 211 requests the file management server 102 to transmit the process definition file. More specifically, the CPU 211 transmits the user ID of the authenticated user to the file management server 102.

Upon receiving the process definition file transmitted by the file management server 102, the process definition file management unit 301 manages the received process definition file. The CPU 211 displays a designation screen, via which the user can designate an arbitrary process definition file according to the information managed by the process definition file management unit 301.

If a plurality of process definition files is acquired, the CPU 211 displays the process definition files on the designation screen as a list.

In step S703, the CPU 211 designates the process definition file according to the instruction issued by the user via the designation screen.

In step S704, the CPU 211 determines whether the user has pressed a "start" button which is displayed on the designation screen. If it is determined that the user has pressed the "start" button (Yes in step S704), then the processing advances to step S705. On the other hand, if it is determined that the user has not pressed the "start" button (No in step S704), then the processing repeats the processing in step S704 and waits until the user presses the "start" button.

In step S705, the CPU 211 executes the reading processing using the scanner 221 according to the definition described in the designated process definition file. In addition, the CPU 211 generates image data according to the definition described in the designated process definition file.

In step S706, the CPU 211 adds, to the process definition file, a description for causing the transmission server 104 to execute processing for notifying a result of transmission of the image data by the transmission server 104.

FIG. 8 illustrates a specific example of the description after the description for instructing the notification of the transmission result is added to the process definition file illustrated in FIG. 6.

A tag 801 defines an instruction for notifying a user of a transmission result by displaying the same. A tag 802 defines an instruction for notifying the user apparatus (i.e., the MFP 103) of the transmission result. A tag 803 defines a transmission result notification destination (i.e., an Internet protocol (IP) address of the MFP 103).

When the transmission server 104 receives the process definition file 800 to which the descriptions of the tags 801 through 803 are added, the transmission server 104 executes processing for notifying the MFP 103 of the transmission result after transmitting the image data.

Returning to FIG. 7, in step S707, the MFP 103 requests the transmission server 104 to transmit the image data by transmitting the generated image data and the process definition file to which the description for notifying the transmission result is added to the transmission server 104.

In step S708, the CPU 211 determines whether the transmission result has been notified from the transmission server 104. If it is determined that the transmission result has been notified from the transmission server 104 (Yes in step S708), then the processing advances to step S709. On the other hand, if it is determined that the transmission result has not yet been notified from the transmission server 104 (No in step S708), then the CPU 211 repeats the processing in step S708 and waits until the transmission server 104 notifies the transmission result.

In step S709, the MFP 103 displays a screen that displays the transmission result according to the content of the notification from the transmission server 104 to notify the user of the transmission result.

Figure 9:
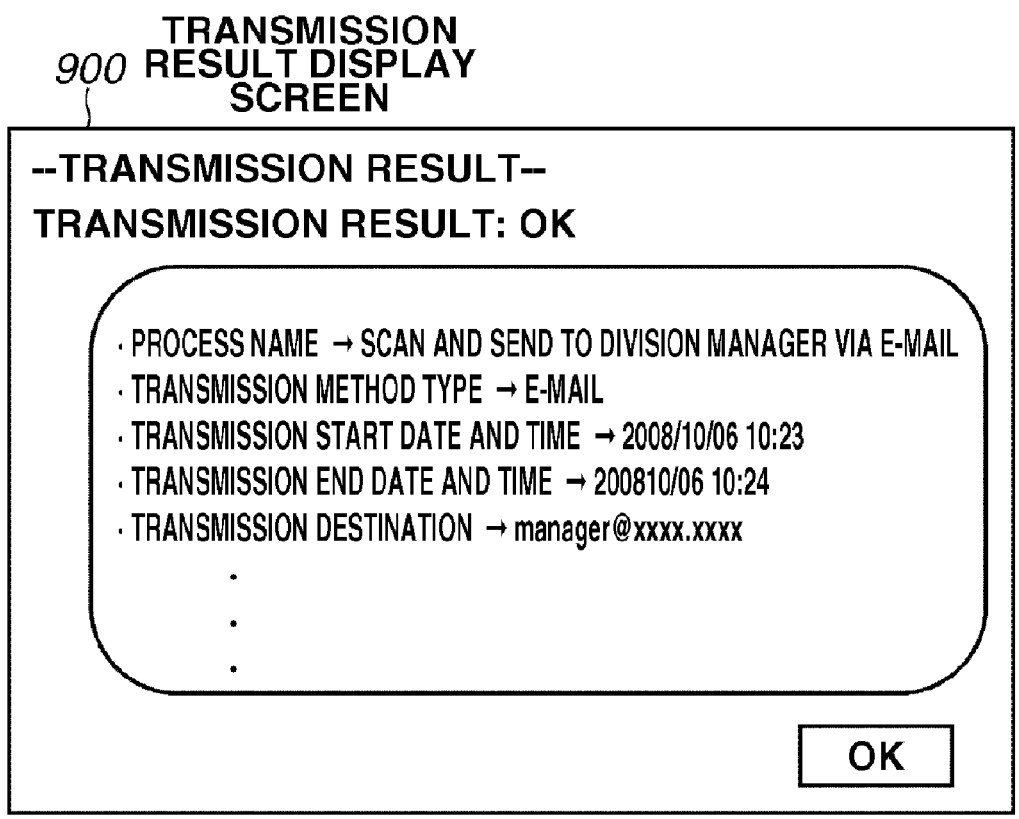
FIG. 9 illustrates an example of a transmission result display screen according to an exemplary embodiment of the present invention.

FIG. 9 illustrates an example of a transmission result display screen 900 displayed in step S709. The transmission result ("OK" (successfully transmitted) in the example illustrated in FIG. 9) is displayed on the transmission result display screen 900 in addition to the process name which indicates the process definition file designated by the user and information indicating start/end time of the processing.

Figure 10:
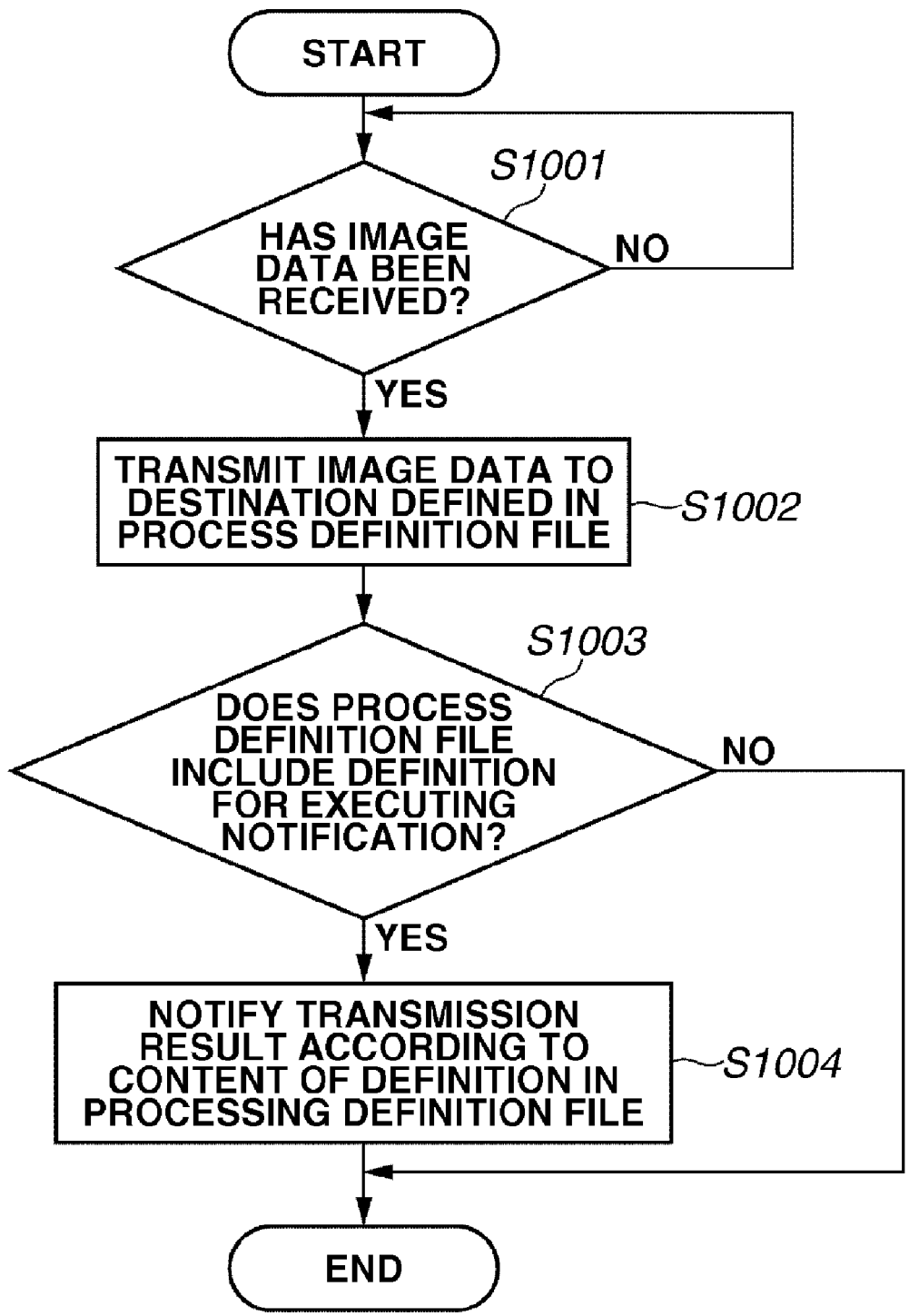
FIG. 10 is a flow chart illustrating an example of processing executed by a transmission server according to an exemplary embodiment of the present invention.

FIG. 10 is a flow chart illustrating an example of processing executed by the transmission server 104 when the MFP 103 has issued a request to transmit image data. Each processing illustrated in the flow chart of FIG. 10 is implemented by the CPU 411 of the transmission server 104 by executing the control program.

In step S1001, the transmission server 104 determines whether image data to be transmitted has been received from the MFP 103. If it is determined that image data to be transmitted has been received from the MFP 103 (YES in step S1001), then the processing advances to step S1002. On the other hand, if it is determined that image data to be transmitted has not been received from the MFP 103 (NO in step S1001), then the transmission server 104 repeats the processing in step S1001 and waits until the image data is received from the MFP 103.

In step S1002, the transmission server 104 analyzes the description in the process definition file received together with the image data in step S1001. In addition, the transmission server 104 transmits the image data according to the content of the process definition file.

In step S1003, the transmission server 104 determines whether an instruction for executing the notification processing is defined in the process definition file. If it is determined that the instruction for executing the notification processing is defined in the process definition file (YES in step S1003), then the processing advances to step S1004. On the other hand, if it is determined that no instruction for executing the notification processing is defined in the process definition file (NO in step S1003), then the processing ends.

In step S1004, the transmission server 104 notifies the result of the transmission of the image data according to the definition included in the process definition file.

More specifically, if the content illustrated in FIG. 8 is described in the process definition file, then the transmission server 104 notifies the MFP 103 which has issued the transmission request of the result of the transmission.

As described above, in the present exemplary embodiment, the MFP 103 generates image data according to the content of the process definition file and requests the transmission server 104 to transmit the image data according to the process definition file.

In addition, the MFP 103 adds, to the process definition file, a description instructing the transmission server 104 to notify the user apparatus (the MFP 103) of the result of the transmission by the transmission server 104 and transmits the image data to be transmitted and the process definition file to which the description is added to the transmission server 104.

Accordingly, even if the process definition file does not include a definition of notification processing at the time the MFP 103 receives the process definition file, the present exemplary embodiment can cause the transmission server 104 to execute the notification processing. Therefore, the user can easily verify the result of the image data transmission processing.

A second exemplary embodiment of the present invention will be described in detail below. In the above-described first exemplary embodiment, when the transmission result is notified from the transmission server 104, the MFP 103 displays the received transmission result on the operation unit 219 to notify the user of the transmission result.

In the present exemplary embodiment, when the transmission result is notified from the transmission server 104, the printer 220 of the MFP 103 prints the transmission result to notify the user of the transmission result.

In addition, in the present exemplary embodiment, the process definition file includes an additional description for notifying different notification destinations of the transmission result according to the status of the printer 220 (whether the printer 220 is in an available state).

FIG. 11 is a flow chart illustrating an example of a series of processing executed by the MFP 103 for generating image data according to the designated process definition file, adding a description for causing the transmission server 104 to notify a transmission result, and requesting the transmission server 104 to transmit the image. Each processing illustrated in the flow chart of FIG. 11 is implemented by the CPU 211 of the MFP 103 by executing the control program.

The processing in steps S701 through S705 in FIG. 11 is similar to that described above with reference to the flow chart of FIG. 7. Accordingly, the description thereof will not be repeated.

In step S1101, the CPU 211 acquires printer status information managed by the printer status information management unit 302.

In the present exemplary embodiment, the "printer status information" refers to information as to whether the printer 220 is currently available. More specifically, if an error, such as paper jamming or exhausted toner, currently occurs on the printer 220, the printer 220 is in an unavailable state.

In step S1102, the CPU 211 determines whether the printer 220 is available according to the printer status information acquired in step S1101. If it is determined that the printer 220 is available (YES in step S1102), then the processing advances to step S1103. In step S1103, the CPU 211 adds, to the process definition file, the description for instructing the transmission server 104 to notify the MFP 103 of the transmission result.

FIG. 12 illustrates a specific example of the description added to the process definition file in step S1103 (FIG. 11). A process definition file 1200 includes a tag 1201 which defines an instruction for notifying a user of the transmission result in printing. A tag 1202 defines an instruction for notifying the user apparatus (i.e., the MFP 103) of the transmission result. A tag 1203 defines a transmission result notification destination (i.e., an IP address of the MFP 103).

When the transmission server 104 receives the process definition file 1200 to which the descriptions of the tags 1201 through 1203 are added, the transmission server 104 executes processing for notifying the MFP 103 of the transmission result after transmitting the image data.

On the other hand, if it is determined in step S1102 that the printer 220 is not available (NO in step S1102), then the processing advances to step S1104. In step S1104, the CPU 211 adds, to the process definition file, a description instructing the transmission server 104 to notify the MFP 106 of the transmission result.

FIG. 13 illustrates a specific example of the description added to the process definition file in step S1104 (FIG. 11). A process definition file 1300 includes a tag 1301 which defines an instruction for notifying the user of the transmission result in printing. A tag 1302 defines an instruction for notifying an apparatus other than the user apparatus (i.e., the MFP 106) of the transmission result. A tag 1303 defines a transmission result notification destination (i.e., an IP address of the MFP 106).

When the transmission server 104 receives the process definition file 1300 to which the descriptions of the tags 1301 through 1303 are added, the transmission server 104 executes processing for notifying the MFP 106 of the transmission result after transmitting the image data.

In the present exemplary embodiment, if the printer 220 of the MFP 103 is not available, then the MFP 106 which is previously designated as a substitute apparatus is used as a transmission result notification destination. However, the present exemplary embodiment is not limited to this configuration. More specifically, if the printer 220 of the MFP 103 is not available, the present exemplary embodiment may search for and identifies an MFP whose printer is available from among other MFPs connected to the LAN 110, and uses the extracted MFP as the transmission result notification destination.

Returning to FIG. 11, in step S1105, the MFP 103 requests the transmission server 104 to transmit the image data by transmitting the generated image data and the process definition file to which the description for notifying the transmission result is added to the transmission server 104.

In step S1106, the CPU 211 of the MFP 103 determines whether a request to the transmission server 104 for notifying the user apparatus (the MFP 103) of the transmission result has been issued. More specifically, if a description for instructing the transmission server 104 to notify the MFP 103 of the transmission result has been added to the process definition file in step S1103, then the CPU 211 determines that the request to notify the user apparatus of the transmission result has been issued (YES in step S1106). Then, the processing advances to step S1107.

On the other hand, if the description for instructing the transmission server 104 to notify the MFP 106 of the transmission result is added to the process definition file in step S1104, then the CPU 211 of the MFP 103 determines that no request to notify the user apparatus (the MFP 103) of the transmission result has been issued (NO in step S1106). Then, the processing ends.

In step S1107, the CPU 211 determines whether the transmission result has been notified from the transmission server 104. If it is determined that the transmission result has been notified from the transmission server 104 (Yes in step S1107), then the processing advances to step S1108. On the other hand, if it is determined that the transmission result has not yet been notified from the transmission server 104 (No in step S1107), then the CPU 211 repeats the processing in step S1107 and waits until the transmission server 104 notifies the transmission result.

In step S1108, the MFP 103 prints the transmission result on a recording medium according to the content of the notification from the transmission server 104 to notify the user of the transmission result.

FIG. 14 illustrates an example of a transmission result report 1400 printed in step S1108. The transmission result ("OK" (successfully transmitted) in the example illustrated in FIG. 14) is printed on the transmission result report 1400 in addition to the process name which indicates the process definition file designated by the user and information indicating the start/end time of the processing.

As described above, the present exemplary embodiment determines the status of the output unit (the printer 220) of the user apparatus (the MFP 103) and adds, to the process definition file, a description for notifying different notification destinations of the transmission result according to the result of the output unit status determination. Accordingly, the transmission result can be notified to an appropriate notification destination.

More specifically, in the present exemplary embodiment, if the printer of the user apparatus is available, then the transmission result can be printed by the printer of the user apparatus while if the printer of the user apparatus is not available, then the transmission result can be printed by the printer of a different other apparatus.

A third exemplary embodiment of the present invention will be described in detail below. In the above-described second exemplary embodiment, the CPU 211 adds, to the process definition file, a description for notifying different notification destinations of the transmission result according to the status of the printer 220 (whether the printer 220 is available).

In the third exemplary embodiment, a description is added, to the process definition file, which instructs notification of the transmission result to different notification destinations according to the authority of the user of the MFP 103 (whether the user has the authority to use the printer 220).

Figure 15:
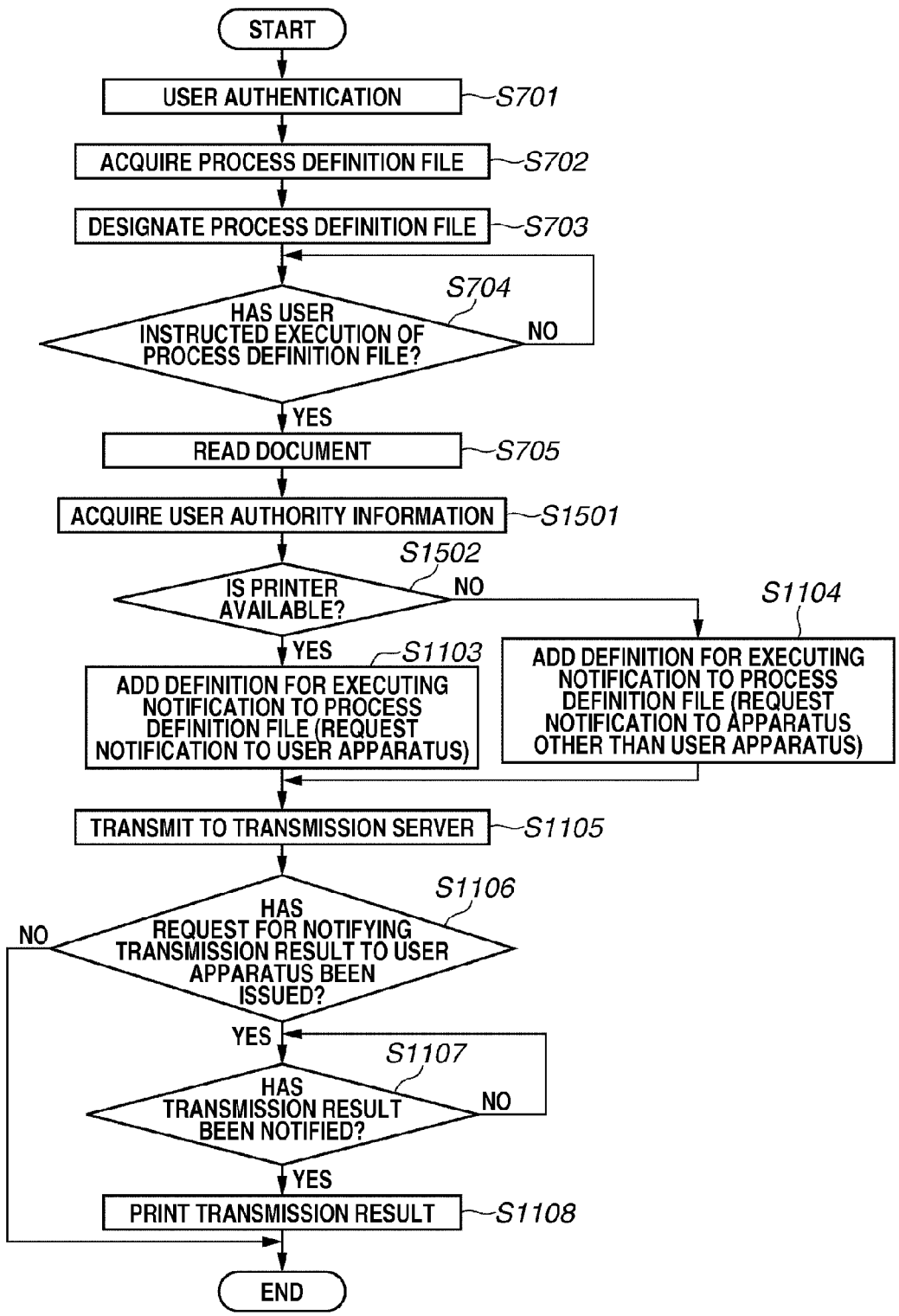
FIG. 15 is a flow chart illustrating an exemplary operation of the MFP according to an exemplary embodiment of the present invention.

FIG. 15 is a flow chart illustrating an example of a series of processing executed by the MFP 103 for generating image data according to the designated process definition file, adding a description for causing the transmission server 104 to notify a transmission result, and requesting the transmission server 104 to transmit the image data. Each processing illustrated in the flow chart of FIG. 15 is implemented by the CPU 211 of the MFP 103 by executing the control program.

The processing in steps S701 through S705 in FIG. 15 is similar to that described above with reference to the flow chart of FIG. 7. Accordingly, the description thereof will not be repeated.

Further, the processing in steps S1103 through S1108 in FIG. 15 is similar to that described above with reference to the flow chart of FIG. 11. Accordingly, the description thereof will not be repeated.

In step S1501, the CPU 211 acquires user authority information which is managed by the user authority information management unit 303.

In the present exemplary embodiment, the "user authority information" refers to information indicating an authority which is provided to each user of the MFP 103 (each user who is authenticated by the user authentication function of the MFP 103) to use the printer 220 and the scanner 221 of the MFP 103.

Figure 16:
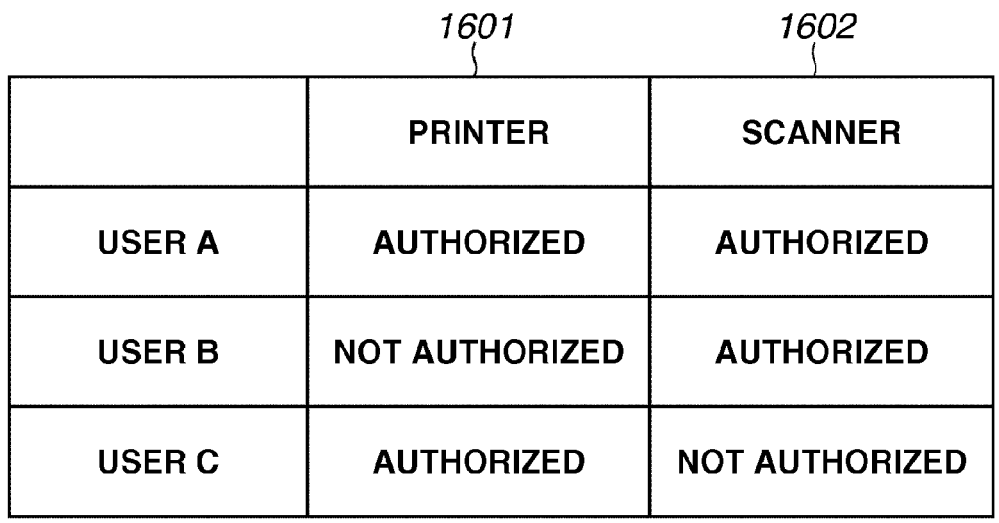
FIG. 16 illustrates an example of a user authority information management table according to an exemplary embodiment of the present invention.

FIG. 16 illustrates an example of a user authority information management table 1600 which is stored in the user authority information management unit 303. The user authority information management table 1600 includes a column 1601 which stores information indicating whether each user is permitted to use the printer 220. In addition, the user authority information management table 1600 includes a column 1602 which stores information indicating whether each user is permitted to use the scanner 221.

Returning to FIG. 15, in step S1502, the CPU 211 determines whether the current user of the MFP 103 has the authority to use the printer 220 based on the user authority information acquired in step S1501. If it is determined that the current user of the MFP 103 has the authority to use the printer 220 (YES in step S1502), then the processing advances to step S1103 (FIG. 11). In step S1103, the CPU 211 adds, to the process definition file, the description for notifying the MFP 103 of the transmission result.

On the other hand, if it is determined that the current user of the MFP 103 does not have the authority to use the printer 220 (NO in step S1502), then the processing advances to step S1104 (FIG. 11). In step S1104, the CPU 211 adds, to the process definition file, a description for notifying the MFP 106 of the transmission result.

In the present exemplary embodiment, if the user does not have the authority to use the printer 220, then the MFP 106 which is previously designated as a substitute apparatus is used as a transmission result notification destination. However, the present exemplary embodiment is not limited to this configuration. More specifically, if the user does not have the authority to use the printer 220, the present exemplary embodiment may search for and identifies an MFP including a printer to which the user is authorized to use, from among other MFPs connected to the LAN 110, and uses the extracted MFP as the transmission result notification destination.

As described above, the present exemplary embodiment determines the presence of the authority of the current user of the MFP 103 (whether the user has the authority to use the printer 220) and adds, to the process definition file, a description for notifying different notification destinations of the transmission result according to the result of the user authority determination. Accordingly, the transmission result can be notified to an appropriate notification destination.

More specifically, in the present exemplary embodiment, if the user has the authority to use the printer of the user apparatus, then the transmission result can be printed by the printer of the user apparatus while if the user does not have the authority to use the printer of the user apparatus, then the transmission result can be printed by the printer of a different other apparatus.

A fourth exemplary embodiment of the present invention will be described in detail below. In the above-described second exemplary embodiment, the CPU 211 adds, to the process definition file, a description for notifying different notification destinations of the transmission result according to the status of the printer 220 (whether the printer 220 is available).

In the fourth exemplary embodiment, a description is added, to the process definition file, which instructs notification of the transmission result to an apparatus corresponding to each user of the MFP 103 according to an attribute of the user.

Figure 17:
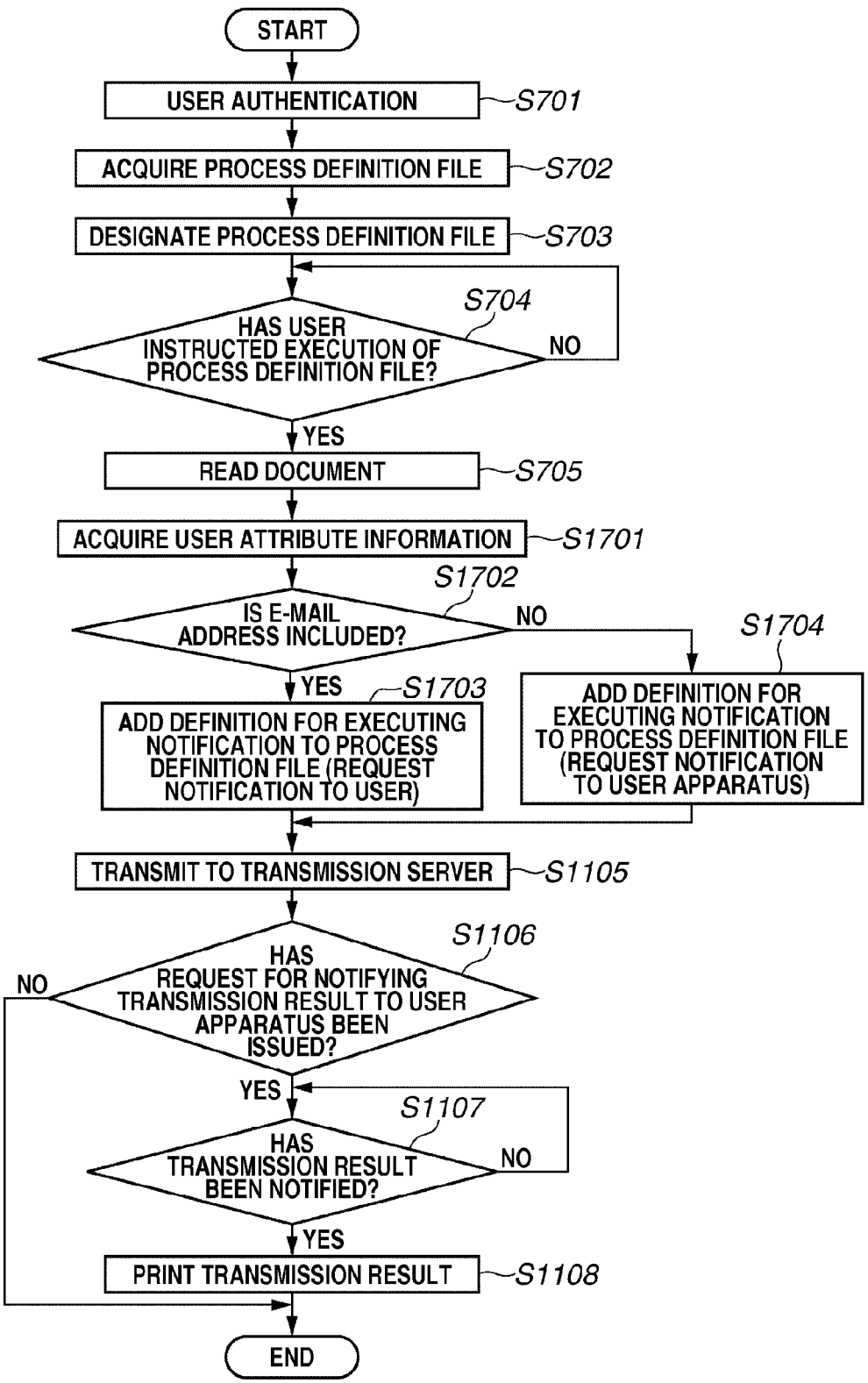
FIG. 17 is a flow chart illustrating an exemplary operation of the MFP according to an exemplary embodiment of the present invention.

FIG. 17 is a flow chart illustrating an example of a series of processing executed by the MFP 103 for generating image data according to the designated process definition file, adding a description for causing the transmission server 104 to notify a transmission result, and requesting the transmission server 104 to transmit the image data. Each processing illustrated in the flow chart of FIG. 17 is implemented by the CPU 211 of the MFP 103 by executing the control program.

The processing in steps S701 through S705 in FIG. 17 is similar to that described above with reference to the flow chart of FIG. 7. Accordingly, the description thereof will not be repeated.

Further, the processing in steps S1105 through S1108 in FIG. 17 is similar to that described above with reference to the flow chart of FIG. 11. Accordingly, the description thereof will not be repeated.

In step S1701, the CPU 211 acquires user attribute information which is managed by the user attribute information management unit 304.

In the present exemplary embodiment, the "user attribute information" refers to information about each user of the MFP 103 (each user who is authenticated by the user authentication function of the MFP 103). More specifically, the "user attribute information" is information indicating an e-mail address of each user.

FIG. 18 illustrates an example of a user attribute information management table 1800 which is stored in the user attribute information management unit 304. The user attribute information management table 1800 functions as a notification destination management unit for managing information about the transmission result notification destination. Further, the user attribute information management table 1800 includes a column 1801 which stores an e-mail address of each user.

Returning to FIG. 17, in step S1702, the CPU 211 determines whether the user attribute information acquired in step S1701 includes the e-mail address of the user.

In the example illustrated in FIG. 18, an e-mail address of each of users A and B is registered but no e-mail address of a user C is registered. Accordingly, if the user C is the current user of the MFP 103, then the user attribute information acquired in step S1701 (FIG. 17) does not include an e-mail address.

If it is determined that the user attribute information acquired in step S1701 includes the e-mail address of the user (YES in step S1702), then the processing advances to step S1703. In step S1703, the CPU 211 adds, to the process definition file, a description for notifying the e-mail address of each user of the transmission result via e-mail.

FIG. 19 illustrates a specific example of the description added to the process definition file in step S1703 (FIG. 17). A process definition file 1900 includes a tag 1901 which defines an instruction for notifying the user of the transmission result via e-mail. A tag 1902 includes a description of the transmission result notification destination (i.e., the e-mail address of the current user of the MFP 103).

When the transmission server 104 receives the process definition file 1900 to which the descriptions of the tags 1901 and 1902 are added, the transmission server 104 executes processing for notifying the e-mail address of each user of the transmission result after transmitting the image data.

On the other hand, if it is determined that no e-mail address is included (NO in step S1702), then the processing advances to step S1704. In step S1704, the CPU 211 adds, to the process definition file, a description for notifying the MFP 103 of the transmission result. The processing to be executed thereafter is similar to the above-described processing in step S1103 (FIG. 11). Accordingly, the description thereof will not be repeated.

FIG. 20 illustrates an example of a transmission result notification e-mail 2000 which is transmitted from the transmission server 104.

The transmission result ("OK" (successfully transmitted) in the example illustrated in FIG. 20) is described in the text of the transmission result notification e-mail 2000 in addition to the process name which indicates the process definition file designated by the user and information indicating the start/end time of the processing.

As described above, the present exemplary embodiment adds, to the process definition file, a description for notifying the notification destination corresponding to each user of the transmission result according to the attribute of the user of the MFP 103.

Accordingly, the user can receive the transmission result on a PC that the user currently operates (i.e., the user PC 105). Therefore, the user does not need to wait at the installation location of the MFP 103 for the notification of the transmission result from the transmission server 104.

In addition, in the present exemplary embodiment, if no e-mail address of the current user of the MFP 103 is not registered, then the transmission server 104 notifies the MFP 103 of the transmission result. Accordingly, the present exemplary embodiment can securely notify the transmission result to the user even when a user whose e-mail address is not registered operates the MFP 103.

A fifth exemplary embodiment of the present invention will be described in detail below. In the above-described second exemplary embodiment, the CPU 211 adds, to the process definition file, a description for notifying different notification destinations of the transmission result according to the status of the printer 220 (whether the printer 220 is available).

In the fifth exemplary embodiment, a description is added, to the process definition file, which instructs notification of the transmission result to different notification destinations according to whether the user is currently logged into the MFP 103 or has already logged out therefrom.

Figure 21:
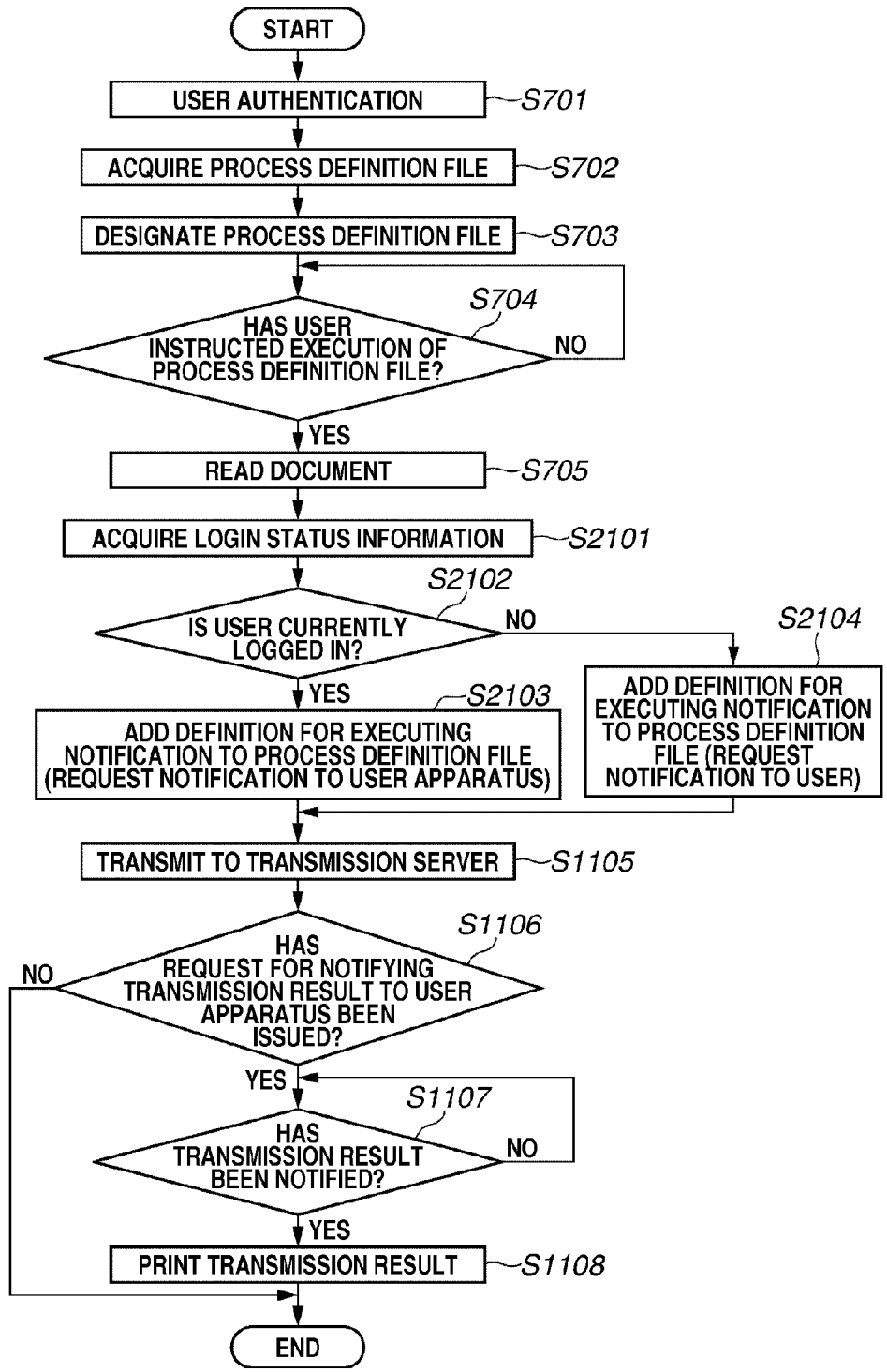
FIG. 21 is a flow chart illustrating an exemplary operation of the MFP according to an exemplary embodiment of the present invention.

FIG. 21 is a flow chart illustrating an example of a series of processing executed by the MFP 103 for generating image data according to the designated process definition file, adding a description for causing the transmission server 104 to notify a transmission result, and requesting the transmission server 104 to transmit the image data. Each processing illustrated in the flow chart of FIG. 21 is implemented by the CPU 211 of the MFP 103 by executing the control program.

The processing in steps S701 through S705 in FIG. 21 is similar to that described above with reference to the flow chart of FIG. 7. Accordingly, the description thereof will not be repeated.

Further, the processing in steps S1105 through S1108 in FIG. 21 is similar to that described above with reference to the flow chart of FIG. 11. Accordingly, the description thereof will not be repeated.

In step S2101, the CPU 211 acquires login status information which is managed by the login status information management unit 305.

In the present exemplary embodiment, the "login status information" refers to information about whether the user is currently logged into the MFP 103 or has already logged out therefrom.

FIG. 22 illustrates an example of a login status information management table 2200 which is stored in the login status information management unit 305. The login status information management table 2200 includes a column 2201 which stores information about the current user of the MFP 103 who has been authenticated by the MFP 103 (i.e., the current login user of the MFP 103). In the example illustrated in FIG. 22, it is indicated that the user A is the current login user of the MFP 103.

If the login user has already logged out from the MFP 103 (more specifically, if no user is currently logged into the MFP 103), then the column 2201 stores a null value "-".

In step S2102 (FIG. 21), the CPU 211 determines whether the user is currently logged into the MFP 103 according to the login status information acquired in step S2101. In the present exemplary embodiment, it is supposed that the user is inhibited from operating the MFP 103 until being authenticated by the MFP 103 according to the input authentication information. More specifically, the CPU 211 does not execute the processing in steps S702 through S705 unless the user is authenticated in step S701.

The login user can log out from the MFP 103 at any desired time after instructing execution of the processing in step S704. Accordingly, at timing after the reading processing in step S705, the user may have already logged out from the MFP 103.

In this case, when the transmission server 104 notifies the MFP 103 of the transmission result, it is highly likely that the user has moved from the installation location of the MFP 103. Accordingly, the transmission result cannot be appropriately notified to the user.

In order to address the above-described problem, in step S2102, the CPU 211 determines whether the user is currently logged into the MFP 103. If it is determined that the user is currently logged into the MFP 103 (YES in step S2102), then the processing advances to step S2103. The processing in step S2103 is similar to that in step S1103 described above with reference to the flow chart of FIG. 11. Accordingly, the description thereof will not be repeated.

On the other hand, if it is determined that that the user is not currently logged into the MFP 103 (NO in step S2102), then the processing advances to step S2104. The processing in step S2104 is similar to that in step S1703 described above with reference to the flow chart of FIG. 17. Accordingly, the description thereof will not be repeated.

As described above, in the present exemplary embodiment, the CPU 211 adds, to the process definition file, a description for notifying different notification destinations of the transmission result according to a result of the determination as to whether the user is currently logged into the MFP 103 or has already logged out therefrom.

More specifically, if the user is currently logged into the MFP 103, the transmission result is notified to the MFP 103. On the other hand, if the user has already logged out from the MFP 103, then the transmission result is transmitted to the e-mail address of each user via e-mail.

Accordingly, if the user is currently logged into the MFP 103, the transmission result can be notified to each user on the MFP 103 while if the user has already logged out from the MFP 103, then the transmission result can be notified to each user on the PC each user currently operates.

A sixth exemplary embodiment of the present invention will be described in detail below. In the present exemplary embodiment, the user can designate the content of the notification processing to be executed by the transmission server 104.

Figure 23:
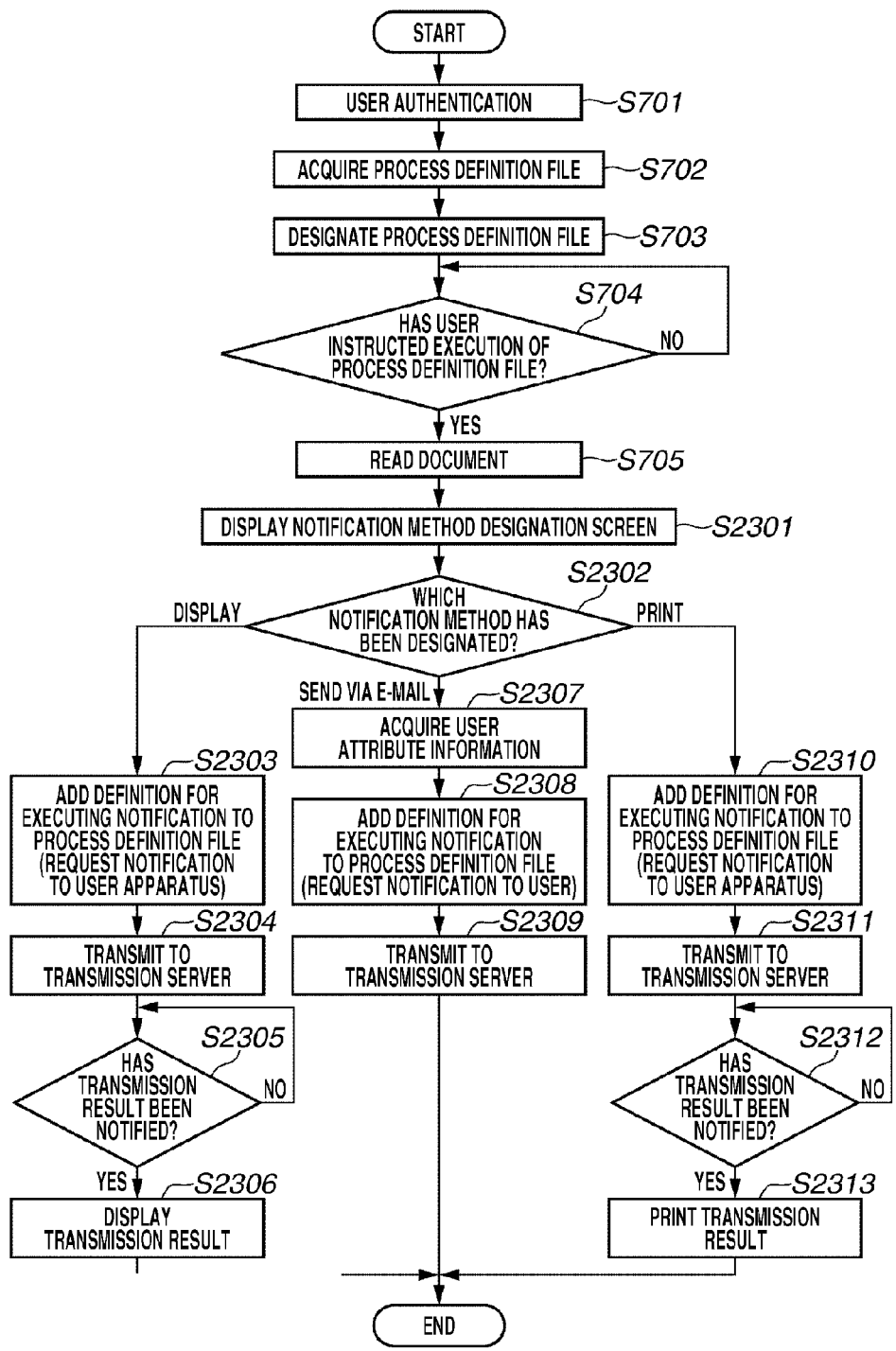
FIG. 23 is a flow chart illustrating an exemplary operation of the MFP according to an exemplary embodiment of the present invention.

FIG. 23 is a flow chart illustrating an example of a series of processing executed by the MFP 103 for generating image data according to the designated process definition file, adding a description for causing the transmission server 104 to notify a transmission result, and requesting the transmission server 104 to transmit the image data. Each processing illustrated in the flow chart of FIG. 23 is implemented by the CPU 211 of the MFP 103 by executing the control program.

The processing in steps S701 through S705 in FIG. 23 is similar to that described above with reference to the flow chart of FIG. 7. Accordingly, the description thereof will not be repeated.

In step S2301, the CPU 211 displays a notification method designation screen for allowing the user to designate a method for notifying the transmission result. The CPU 211 receives the user designation on the notification method via the notification method designation screen.

Figure 24:
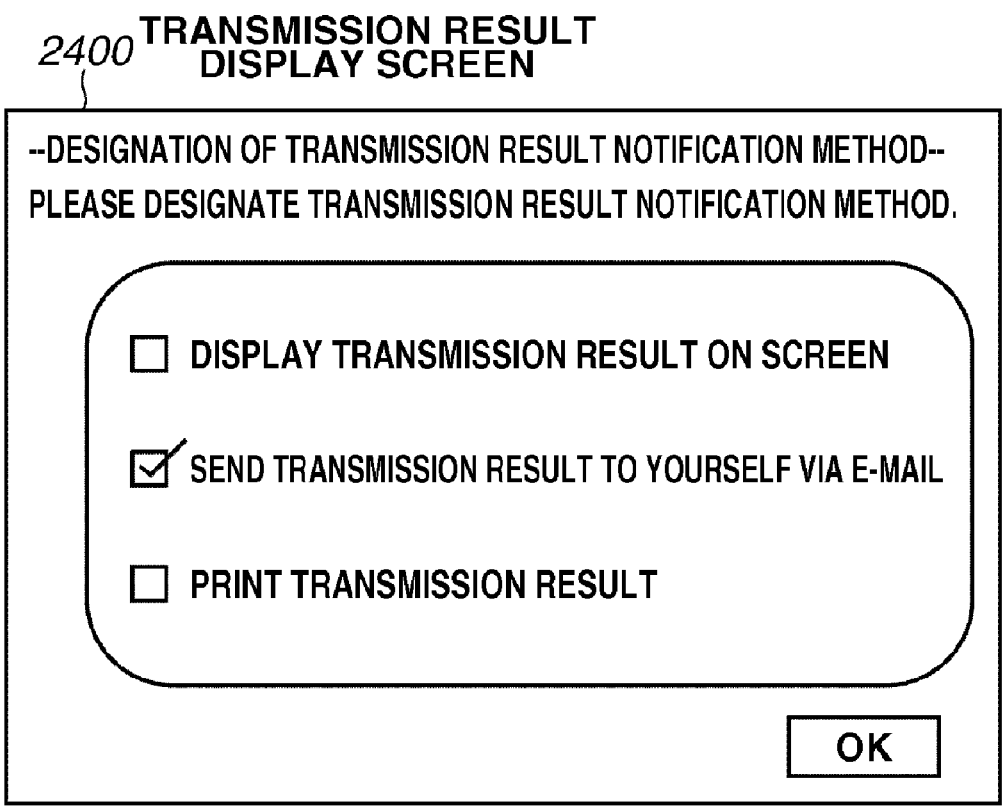
FIG. 24 illustrates an example of a notification method designation screen according to an exemplary embodiment of the present invention.

FIG. 24 illustrates an example of a notification method designation screen 2400 displayed on the operation unit 219.

The user can execute the designation by touching the touch panel of the operation unit 219 from among alternative methods such as "display transmission result on screen (displayed on the operation unit 219 of the MFP 103)", "notify transmission result to yourself (to the user's PC) via e-mail", and "print transmission result (on the printer 220 of the MFP 103)". In the example illustrated in FIG. 24, the user has designated the method "notify transmission result to yourself via e-mail".

In step S2302 (FIG. 23), the CPU 211 determines which of the "display", "send by e-mail", and "print" has been designated by the user as the notification method.

If "display" has been designated by the user as the notification method, then the processing advances to step S2303. The processing in steps S2303 through S2306 is similar to that in steps S706 through S709 described above with reference to the flow chart of FIG. 7. Accordingly, the description thereof will not be repeated.

If "send by e-mail" has been designated by the user as the notification method, then the processing advances to step S2307. The processing in steps S2307 through S2309 is similar to that in steps S1701, S1703, and S1105 described above with reference to the flow charts of FIG. 17. Accordingly, the description thereof will not be repeated.

If "print" has been designated by the user as the notification method, then the processing advances to step S2310. The processing in steps S2310 through S2313 is similar to that in steps S1103, S1105, S1107, and S1108 described above with reference to the flow chart of FIG. 11. Accordingly, the description thereof will not be repeated.

In the example illustrated in FIG. 23, after executing the document reading processing in step S705, the CPU 211 advances to step S2301. However, the present exemplary embodiment is not limited to this configuration. More specifically, the processing in step S2301 may be executed before receiving the processing executing instruction in step S704 or immediately after receiving the same.

As described above, the present exemplary embodiment can notify the user of the transmission result by using the notification method desired by the user by allowing the user to designate the notification method.

A seventh exemplary embodiment of the present invention will be described in detail below. In the above-described sixth exemplary embodiment, the user designates the content of the notification processing to be executed by the transmission server 104 every time the CPU 211 executes the process definition file.

In the seventh exemplary embodiment, the administrator of the MFP 103 previously sets a notification method for each user and the notification method is automatically determined according to the user authenticated by the MFP 103.

Figure 25:
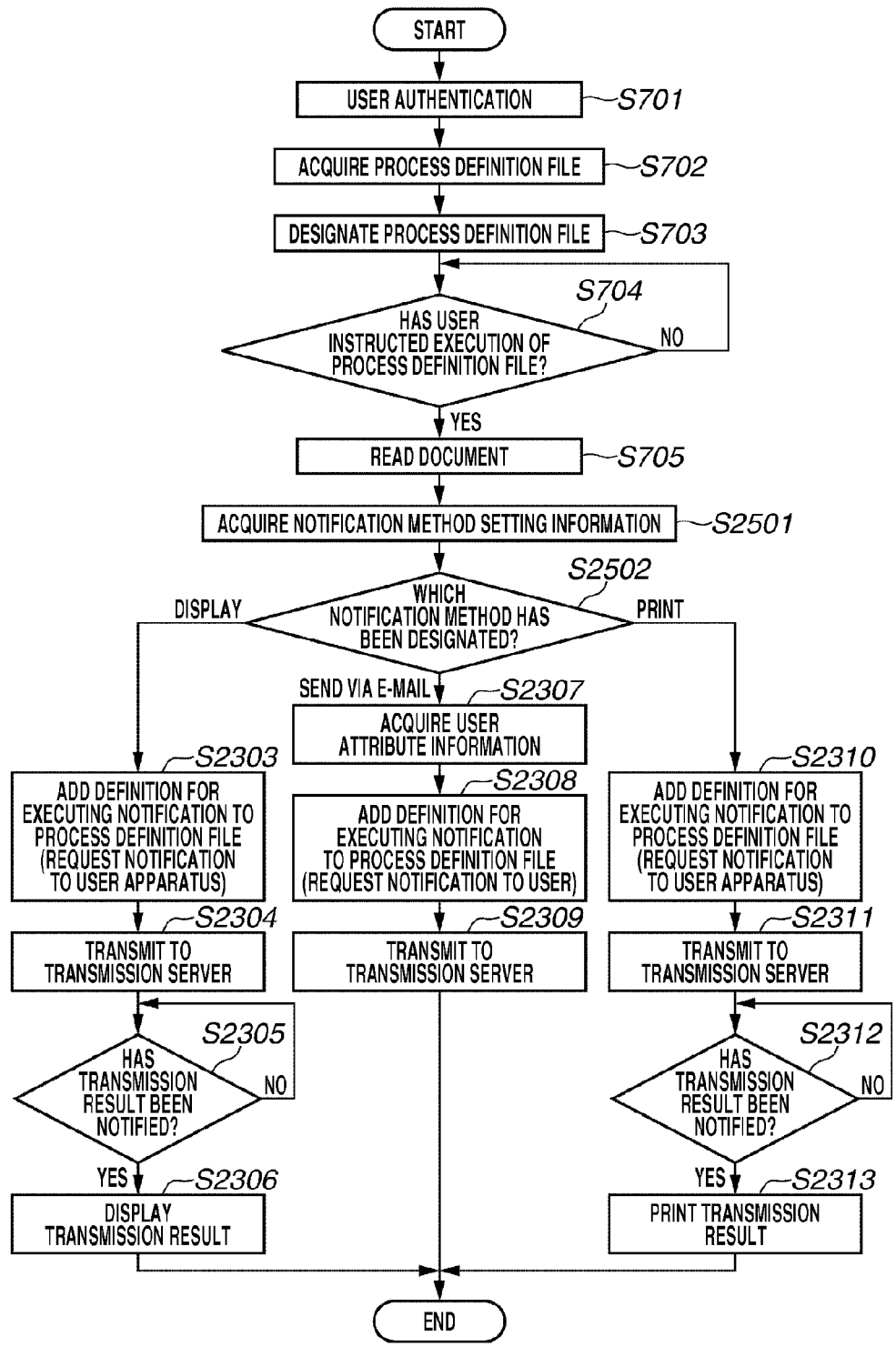
FIG. 25 is a flow chart illustrating an exemplary operation of the MFP according to an exemplary embodiment of the present invention.

FIG. 25 is a flow chart illustrating an example of a series of processing executed by the MFP 103 for generating image data according to the designated process definition file, adding a description for causing the transmission server 104 to notify a transmission result, and requesting the transmission server 104 to transmit the image data. Each processing illustrated in the flow chart of FIG. 25 is implemented by the CPU 211 of the MFP 103 by executing the control program.

The processing in steps S701 through S705 in FIG. 25 is similar to that described above with reference to the flow chart of FIG. 7. Accordingly, the description thereof will not be repeated.

Further, the processing in steps S2303 through S2313 in FIG. 25 is similar to that described above with reference to the flow chart of FIG. 23. Accordingly, the description thereof will not be repeated.

In step S2501, the CPU 211 acquires notification method setting information which is managed by the notification method setting information management unit 306.

In the present exemplary embodiment, the "notification method setting information" refers to information including the notification method previously set by the administrator of the MFP 103 for each user.

FIG. 26 illustrates an example of a notification method setting information management table 2600 which is stored in the notification method setting information management unit 306. The notification method setting information management table 2600 includes a column 2601 that stores a process ID which uniquely identifies each user authenticated by the MFP 103 and the corresponding process definition file and a column 2602 which stores information about the notification method corresponding to each user and the process ID of the user.

In the example illustrated in FIG. 26, if the user A executes the process definition file having the process ID "0001", the notification method "print" is automatically set.

Moreover, if the user A executes a process definition file other than the process definition file of the process ID "0001", then the notification method "send by e-mail" is automatically set. In addition, if the user B executes a process definition file, the notification method "display" is automatically set regardless of which process definition file the user B executes.

Returning to FIG. 25, in step S2502, the CPU 211 determines which notification method has been set according to the notification method setting information acquired in step S2501. If the notification method "display" has been designated, then the processing advances to step S2303. On the other hand, if the notification method "send by e-mail" has been designated, then the processing advances to step S2307 while if the notification method "print" has been designated, then the processing advances to step S2310.

As described above, in the present exemplary embodiment, the administrator of the MFP 103 previously sets a notification method in association with each user and each process ID. Accordingly, an appropriate notification method is automatically designated.

Therefore, the user does not need to designate a notification method every time the user executes a process definition file, and can be saved from performing complicated operations.

Each of the first through the seventh exemplary embodiment of the present invention described above can be implemented solely or in combination of a plurality of the exemplary embodiments where necessary.

Aspects of the present invention can also be realized by a computer of a system or apparatus (or devices such as a CPU or micro-processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). The program includes computer executable instructions for implementing the present invention. For this purpose, the program is provided to the computer for example via a network or from a recording medium of various types serving as the memory device (e.g., computer-readable storage medium).

An operating system (OS) or other application software running on a computer can execute part or all of actual processing based on instructions of the program to realize the functions one or more of the above-described exemplary embodiments.

Additionally, the program read out of a storage medium can be written into a memory of a function expansion card inserted in a computer or into a memory of a function expansion unit connected to the computer. In this case, based on instructions of the program, a CPU or MPU provided on the function expansion card or the function expansion unit can execute part or all of the processing to realize the functions of one or more of the above-described exemplary embodiments.

A wide variety of storage media may be used to store the program. The storage medium may be, for example, any of a flexible disk (floppy disk), a hard disk, an optical disk, a magneto-optical disk, a compact disc (CD), a digital versatile disc (DVD), a read only memory (ROM), a CD-recordable (R), a CD-rewritable, a DVD-recordable, a DVD-rewritable, a magnetic tape, a nonvolatile memory card, a flash memory device, and so forth.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-281857, filed Oct. 31, 2008, which is hereby incorporated by reference herein in its entirety.

What is claimed is:
1. An image processing apparatus comprising:
a reading unit configured to read an image of a document and generate image data based on the read image of the document;

an acquisition unit configured to acquire a process definition file which defines a content of reading processing to be executed by the reading unit and a content of transmission processing for transmitting the image data generated by the reading unit;

a reading control unit configured to cause the reading unit to execute the reading processing and to generate image data according to a definition described in the process definition file acquired by the acquisition unit;

a requesting unit configured to request an external apparatus to transmit the image data generated by the reading unit according to the definition described in the process definition file acquired by the acquisition unit; and an adding unit configured to add, to the process definition file acquired by the acquisition unit, a description for instructing the external apparatus to execute notification processing for notifying a result of the transmission processing of the image data carried out by the external apparatus, wherein the requesting unit is configured to issue the request by transmitting, to the external apparatus, the image data generated by the reading unit and the process definition file to which the description for instructing the external apparatus to execute the processing for notifying the result of the transmission processing is added by the adding unit; and further comprising:

an output unit configured, if the result of the transmission processing is notified from the external apparatus, to output the notified result of the transmission processing; and a status determination unit configured to determine whether the output unit is available, wherein when the status determination unit determines that the output unit is available, the adding unit adds, to the process definition file, a description for notifying the image processing apparatus of the result of the transmission processing, and when the status determination unit determines that the output unit is not available, the adding unit adds, to the process definition file, a description for notifying an apparatus different from the image processing apparatus of the result of the transmission processing.

2. The image processing apparatus according to claim 1, wherein the adding unit is configured to add, to the process definition file, a description for notifying the image processing apparatus of the result of the transmission processing.

3. An image processing apparatus comprising:
a reading unit configured to read an image of a document and generate image data based on the read image of the document;

an acquisition unit configured to acquire a process definition file which defines a content of reading processing to be executed by the reading unit and a content of transmission processing for transmitting the image data generated by the reading unit;

a reading control unit configured to cause the reading unit to execute the reading processing and to generate image data according to a definition described in the process definition file acquired by the acquisition unit;

a requesting unit configured to request an external apparatus to transmit the image data generated by the reading unit according to the definition described in the process definition file acquired by the acquisition unit; and an adding unit configured to add, to the process definition file acquired by the acquisition unit, a description for instructing the external apparatus to execute notification processing for notifying a result of the transmission processing of the image data carried out by the external apparatus, wherein the requesting unit is configured to issue the request by transmitting, to the external apparatus, the image data generated by the reading unit and the process definition file to which the description for instructing the external apparatus to execute the processing for notifying the result of the transmission processing is added by the adding unit; and further comprising:

an output unit configured, if the result of the transmission processing is notified from the external apparatus, to output the notified result of the transmission processing;

an authentication unit configured to authenticate a user; and an authority determination unit configured to determine whether the user authenticated by the authentication unit has authority to use the output unit, wherein when the authority determination unit determines that the user authenticated by the authentication unit has the authority to use the output unit, the adding unit adds, to the process definition file, a description for notifying the image processing apparatus of the result of the transmission processing, and when the authority determination unit determines that the user authenticated by the authentication unit does not have the authority to use the output unit, the adding unit adds, to the process definition file, a description for notifying an apparatus different from the image processing apparatus of the result of the transmission processing.

4. The image processing apparatus according to claim 1, wherein the output unit is a printing unit configured to print the notified result of the transmission processing on a recording medium.

5. An image processing apparatus comprising:
a reading unit configured to read an image of a document and generate image data based on the read image of the document;

an acquisition unit configured to acquire a process definition file which defines a content of reading processing to be executed by the reading unit and a content of transmission processing for transmitting the image data generated by the reading unit;

a reading control unit configured to cause the reading unit to execute the reading processing and to generate image data according to a definition described in the process definition file acquired by the acquisition unit;

a requesting unit configured to request an external apparatus to transmit the image data generated by the reading unit according to the definition described in the process definition file acquired by the acquisition unit; and an adding unit configured to add, to the process definition file acquired by the acquisition unit, a description for instructing the external apparatus to execute notification processing for notifying a result of the transmission processing of the image data carried out by the external apparatus, wherein the requesting unit is configured to issue the request by transmitting, to the external apparatus, the image data generated by the reading unit and the process definition file to which the description for instructing the external apparatus to execute the processing for notifying the result of the transmission processing is added by the adding unit; and further comprising:

an authentication unit configured to authenticate a user; and a notification destination management unit configured to manage a notification destination corresponding to each user authenticated by the authentication unit, wherein the adding unit is configured to identify a notification destination corresponding to the user authenticated by the authentication unit from among the notification destinations managed by the notification destination management unit, and configured to add, to the process definition file, a description for notifying the identified notification destination of the result of the transmission processing.

6. The image processing apparatus according to claim 5, wherein if the notification destination corresponding to the user authenticated by the authentication unit is not managed by the notification destination management unit, the adding unit adds, to the process definition file, a description for notifying the image processing apparatus of the result of the transmission processing.

7. The image processing apparatus according to claim 5, further comprising:

a determination unit configured to determine whether the user authenticated by the authentication unit is currently logged into or has already logged out from the image processing apparatus, wherein when the determination unit determines that the user authenticated by the authentication unit is currently logged into the image processing apparatus, the adding unit adds, to the process definition file, a description for notifying the image processing apparatus of the result of the transmission processing, and when the determination unit determines that the user authenticated by the authentication unit has already logged out from the image processing apparatus, the adding unit adds, to the process definition file, a description for notifying the notification destination corresponding to the user authenticated by the authentication unit among the notification destinations managed by the notification destination management unit of the result of the transmission processing.

8. The image processing apparatus according to claim 5, wherein the notification destination managed by the notification destination management unit is an e-mail address.

9. The image processing apparatus according to claim 1, further comprising:

a selection unit configured to select a notification method for notifying a user of the result of the transmission processing according to an instruction from the user, wherein the adding unit is configured to add, to the process definition file, a description for notifying the result of the transmission processing by the notification method selected by the selection unit.

10. The image processing apparatus according to claim 1, further comprising:

a setting unit configured to set a notification method for notifying a user of the result of the transmission processing, wherein the adding unit is configured to add, to the process definition file, a description for notifying the result of the transmission processing by the notification method previously set by the setting unit.

11. The image processing apparatus according to claim 1, wherein the acquisition unit is configured to acquire the process definition file managed by a file management server which is connected to the image processing apparatus by requesting the file management server to send the process definition file.

12. A method for controlling an image processing apparatus which has both: a reading unit configured to read an image of a document and generate image data based on the read image of the document, and an output unit, the method comprising:

acquiring a process definition file which defines a content of reading processing to be executed by the reading unit and a content of transmission processing for transmitting the image data generated by the reading unit;

causing the reading unit to execute the reading processing and to generate image data according to a definition described in the acquired process definition file;

requesting an external apparatus to transmit the generated image data according to the definition described in the acquired process definition file;

adding, to the acquired process definition file, a description for instructing the external apparatus to execute notification processing for notifying a result of the transmission processing of the image data carried out by the external apparatus; and making the request by transmitting, to the external apparatus, the image data generated by the reading unit and the process definition file to which the description for instructing the external apparatus to execute the processing for notifying the result of the transmission processing is added;

causing the output unit, if the result of the transmission processing is notified from the external apparatus, to output the notified result of the transmission processing; and determining whether the output unit is available, wherein when the determining determines that the output unit is available, the adding adds, to the process definition file, a description for notifying the image processing apparatus of the result of the transmission processing, and when the determining determines that the output unit is not available, the adding adds, to the process definition file, a description for notifying an apparatus different from the image processing apparatus of the result of the transmission processing.

13. A non-transitory computer-readable storage medium that stores a program of instructions capable of causing a computer to implement a method for controlling an image processing apparatus, which image processing apparatus has both: a reading unit configured to read an image of a document and generate image data based on the read image of the document, and an output unit, the program of instructions comprising:

instructions for acquiring a process definition file which defines a content of reading processing to be executed by the reading unit and a content of transmission processing for transmitting the image data generated by the reading unit;

instructions for causing the reading unit to execute the reading processing and to generate image data according to a definition described in the acquired process definition file;

instructions for requesting an external apparatus to transmit the generated image data according to the definition described in the acquired process definition file;

instructions for adding, to the acquired process definition file, a description for instructing the external apparatus to execute notification processing for notifying a result of the transmission processing of the image data carried out by the external apparatus; and instructions for making the request by transmitting, to the external apparatus, the image data generated by the reading unit and the process definition file to which the description for instructing the external apparatus to execute the processing for notifying the result of the transmission processing is added;

instructions for causing the output unit, if the result of the transmission processing is notified from the external apparatus, to output the notified result of the transmission processing; and instructions for determining whether the output unit is available, wherein when the determining determines that the output unit is available, the adding adds, to the process definition file, a description for notifying the image processing apparatus of the result of the transmission processing, and when the determining determines that the output unit is not available, the adding adds, to the process definition file, a description for notifying an apparatus different from the image processing apparatus of the result of the transmission processing.

14. A method of processing an image of a document using an image processing apparatus which has both: a reading unit configured to read the image of the document and generate image data based on the read image of the document, and an output unit, the method comprising:

causing the reading unit to read the image of the document and generate image data based on the read image of the document;

acquiring a process definition file which defines a content of reading processing to be executed by the reading unit and a content of transmission processing for transmitting the image data generated by the reading unit;

causing the reading unit to execute the reading processing and to generate image data according to a definition described in the process definition file acquired by the acquiring;

requesting an external apparatus to transmit the image data generated by the reading unit according to the definition described in the process definition file acquired by the acquiring; and adding, to the process definition file acquired by the acquiring, a description for instructing the external apparatus to execute notification processing for notifying a result of the transmission processing of the image data carried out by the external apparatus, wherein the requesting issues the request by transmitting, to the external apparatus, the image data generated by the reading unit and the process definition file to which the description for instructing the external apparatus to execute the processing for notifying the result of the transmission processing is added by the adding; and further comprising:

causing the output unit, if the result of the transmission processing is notified from the external apparatus, to output the notified result of the transmission processing;

authenticating a user; and determining whether the user authenticated by the authenticating has authority to use the output unit, wherein when the determining determines that the user authenticated by the acquiring has the authority to use the output unit, the adding adds, to the process definition file, a description for notifying the image processing apparatus of the result of the transmission processing, and when the determining determines that the user authenticated by the acquiring does not have the authority to use the output unit, the adding adds, to the process definition file, a description for notifying an apparatus different from the image processing apparatus of the result of the transmission processing.

15. A non-transitory computer-readable storage medium that stores a program of instructions capable of causing a computer to implement a method of processing an image of a document using an image processing apparatus, the image processing apparatus having both: a reading unit configured to read the image of the document and generate image data based on the read image of the document, and an output unit, the program of instructions comprising:

instructions for causing the reading unit to read the image of the document and generate image data based on the read image of the document;

instructions for acquiring a process definition file which defines a content of reading processing to be executed by the reading unit and a content of transmission processing for transmitting the image data generated by the reading unit;

instructions for causing the reading unit to execute the reading processing and to generate image data according to a definition described in the process definition file acquired by the acquiring;

instructions for requesting an external apparatus to transmit the image data generated by the reading unit according to the definition described in the process definition file acquired by the acquiring; and instructions for adding, to the process definition file acquired by the acquiring, a description for instructing the external apparatus to execute notification processing for notifying a result of the transmission processing of the image data carried out by the external apparatus, wherein the requesting issues the request by transmitting, to the external apparatus, the image data generated by the reading unit and the process definition file to which the description for instructing the external apparatus to execute the processing for notifying the result of the transmission processing is added by the adding; and further comprising:

instructions for causing the output unit, if the result of the transmission processing is notified from the external apparatus, to output the notified result of the transmission processing;

instructions for authenticating a user; and instructions for determining whether the user authenticated by the authenticating has authority to use the output unit, wherein when the determining determines that the user authenticated by the acquiring has the authority to use the output unit, the adding adds, to the process definition file, a description for notifying the image processing apparatus of the result of the transmission processing, and when the determining determines that the user authenticated by the acquiring does not have the authority to use the output unit, the adding adds, to the process definition file, a description for notifying an apparatus different from the image processing apparatus of the result of the transmission processing.

16. A method of processing an image of a document using an image processing apparatus which has a reading unit configured to read the image of the document, the method comprising:

causing the reading unit to read the image of the document and generate image data based on the read image of the document;

acquiring a process definition file which defines a content of reading processing to be executed by the reading unit and a content of transmission processing for transmitting the image data generated by the reading unit;

causing the reading unit to execute the reading processing and to generate image data according to a definition described in the process definition file acquired by the acquiring;

requesting an external apparatus to transmit the image data generated by the reading unit according to the definition described in the process definition file acquired by the acquiring; and adding, to the process definition file acquired by the acquisition unit, a description for instructing the external apparatus to execute notification processing for notifying a result of the transmission processing of the image data carried out by the external apparatus, wherein the requesting issues the request by transmitting, to the external apparatus, the image data generated by the reading unit and the process definition file to which the description for instructing the external apparatus to execute the processing for notifying the result of the transmission processing is added by the adding; and further comprising:

authenticating a user; and managing a notification destination corresponding to each user authenticated by the authenticating, wherein the adding identifies a notification destination corresponding to the user authenticated by the authenticating from among the notification destinations managed by the managing, and adds, to the process definition file, a description for notifying the identified notification destination of the result of the transmission processing.

17. A non-transitory computer-readable storage medium that stores a program of instructions capable of causing a computer to implement a method of processing an image of a document using an image processing apparatus, the image processing apparatus having a reading unit configured to read the image of the document and generate image data based on the read image of the document, the program of instructions comprising:

instructions for causing the reading unit to read the image of the document and generate image data based on the read image of the document;

instructions for acquiring a process definition file which defines a content of reading processing to be executed by the reading unit and a content of transmission processing for transmitting the image data generated by the reading unit;

instructions for causing the reading unit to execute the reading processing and to generate image data according to a definition described in the process definition file acquired by the acquiring;

instructions for requesting an external apparatus to transmit the image data generated by the reading unit according to the definition described in the process definition file acquired by the acquiring; and instructions for adding, to the process definition file acquired by the acquisition unit, a description for instructing the external apparatus to execute notification processing for notifying a result of the transmission processing of the image data carried out by the external apparatus, wherein the requesting issues the request by transmitting, to the external apparatus, the image data generated by the reading unit and the process definition file to which the description for instructing the external apparatus to execute the processing for notifying the result of the transmission processing is added by the adding; and further comprising:

instructions for authenticating a user; and instructions for managing a notification destination corresponding to each user authenticated by the authenticating, wherein the adding identifies a notification destination corresponding to the user authenticated by the authenticating from among the notification destinations managed by the managing, and adds, to the process definition file, a description for notifying the identified notification destination of the result of the transmission processing.

* * * * *